(12) United States Patent
Endou

(10) Patent No.: US 7,439,631 B2
(45) Date of Patent: Oct. 21, 2008

(54) HYBRID POWER SUPPLY SYSTEM

(75) Inventor: Takayoshi Endou, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 1364 days.

(21) Appl. No.: 10/345,389

(22) Filed: Jan. 16, 2003

(65) Prior Publication Data

US 2007/0273209 A1 Nov. 29, 2007

(30) Foreign Application Priority Data

Jan. 17, 2002 (JP) ............................... 2002-008535

(51) Int. Cl.
*B60L 1/00* (2006.01)
(52) U.S. Cl. ....................................................... 307/9.1
(58) Field of Classification Search .................... 307/9.1
See application file for complete search history.

(56) References Cited

FOREIGN PATENT DOCUMENTS

| JP | 50-153226 A | 12/1975 |
|---|---|---|
| JP | 55-133777 A | 10/1980 |
| JP | S62-168750 A | 10/1987 |
| JP | 8-126119 | 5/1996 |
| JP | 10-80008 | 3/1998 |
| JP | H10-236743 A | 9/1998 |
| JP | 11-146566 | 5/1999 |
| JP | 2000-295715 A | 10/2000 |
| JP | 2001-136607 | 5/2001 |

OTHER PUBLICATIONS

Nobuyuki Kasuga et al.; Ultra-Capacitor and battery Hybrid EV with High Efficiency Battery Load Leveling System, Proceedings of EVS-15, Brussels 1998.*

Nobuyuki Kasuga et al.; Ultra-Capacitor and Battery Hybrid EV with High Efficiency Battery Load Leveling System, Proceedings of EVS-15, Brussels 1998.

(Continued)

*Primary Examiner*—Robert L. DeBeradinis
(74) *Attorney, Agent, or Firm*—Westerman, Hattori, Daniels & Adrian, LLP.

(57) ABSTRACT

It is an object of the present invention to provide a high efficiency hybrid power supply system that permits a power type power supply device such as a capacitor to be utilized effectively, and that makes it possible to even the burden on an energy type power supply device such as a storage cell. A capacitor 21 is connected to system voltage lines 26 and 27 which are connected to a load 30, and a body formed by a serial connection between a large-capacity storage cell 22 and the output terminal of a voltage controller 23 is connected in parallel with this capacitor 21. The voltage Vb of the storage cell 22 is substantially constant. The voltage controller 23 is a DC/DC converter, for example, the output voltage Vv of which is variable. A system controller 25 changes the system voltage Vs by changing the output voltage Vv of the voltage controller 23. When a large amount of electric power is to be supplied to the load 30, energy is rapidly discharged from the capacitor 21 and supplied to the load 30 by lowering the system voltage Vs. When a large amount of electric power is to be fed back from the load 30, energy from the load 30 is rapidly absorbed by the capacitor 21 by raising the system voltage Vs.

12 Claims, 20 Drawing Sheets

OTHER PUBLICATIONS

N. Kasuga et al.; Ultra-Capacitor and Battery Hybrid System Drives Electric Scooter, Proceedings of the 31st. ISATA, Dusseldorf 1998.

N. Kasuga et al.; High Efficiency System Configuration for Ultra-capacitor and Battery Hybrid Electric Vehicle, The Institute of Electrical Engineers of Japan, Akita, 1998.

N. Kasuga et al.; High Efficiency Power Supply System for a Hybrid Electric Vehicle, The Institute of Electrical Engineers of Japan, Nagasaki, 1999.

N. Kasuga et al.; High Efficiency Battery Load Leveling EV, Proceedings of EVS-16, Beijing 1999.

* cited by examiner

HYBRID POWER SUPPLY SYSTEM

TECHNICAL FIELD

The present invention relates to a preferred hybrid power supply system which is a drive supply device for an electric vehicle, electric construction vehicle, and the like, for example.

BACKGROUND ART

Known examples of hybrid-type power supply systems made by combining at least two types of power supply device that have different characteristics are power supply systems that supply DC electric power via an inverter (DC converter) to a three-phase AC motor constituting the motive power source of an electric vehicle or the like. One such type of power supply device used here is a power supply device that will be referred to in this specification as an 'energy type' power supply device which holds a large amount of energy and that permits electric power to be supplied stably and over long periods. The other type is a power supply device that will be referred to in this specification as a 'power type' power supply device which is capable of supplying and absorbing a large amount of power in step with sudden changes in the load such as those occurring during acceleration/deceleration. Examples of energy type devices include high capacity storage cells, fuel cells, and engine drive generators, while examples of power type devices include capacitors and hybrid cells and the like.

Hybrid power supply systems combine energy type devices and power type devices in order to even the burden on an energy type device as a result of a power type device adapting to load fluctuations during acceleration and deceleration, for example. FIGS. 1 to 3 show three kinds of constitution serving to represent conventionally known hybrid power supply systems.

The hybrid power supply system 1 shown in FIG. 1 has the most primitive constitution in which a storage cell 2 that typifies an energy type device and a capacitor 3 that typifies a power type device are simply connected in parallel. The substantially fixed voltage from the storage cell 2 is outputted to an inverter 4.

In this primitive hybrid power supply system 1, the voltage of the storage cell 2 is applied to the capacitor 3 as is. Here, the fluctuation width of the voltage of the storage cell 2 is small. For this reason, only a small amount of energy that corresponds with this small voltage fluctuation width can be supplied from the capacitor 3 to the inverter 4. In other words, the amount of energy stored in the capacitor 3 cannot be utilized effectively.

In the second-type hybrid power supply system 5 shown in FIG. 2, a storage cell 6 is connected to the inputs of a current-source type DC/DC converter 7, the outputs of the DC/DC converter 7 being connected in parallel to a capacitor 8. The supply of energy to the inverter 4 is performed by the capacitor 8, while the supply of energy to the capacitor 8 is performed by the cell 6 via the current-source type DC/DC converter 7. The output voltage to the inverter 4 is controlled so as to be substantially constant.

The second-type hybrid power supply system 5 shown in FIG. 2 affords the benefit that there is a large degree of freedom in the selection of the voltage of the storage cell 6. However, because the voltage fluctuation width of the storage cell 6 is small, there is naturally the problem that the energy stored in the capacitor 8 cannot be utilized effectively. However, because of the requirement for a DC/DC converter 7 that has an electrical capacitance equal to that of the inverter 4, the DC/DC converter 7 is large in size and the cost thereof is high. In addition, the efficiency drops in step with the electric power consumption of the DC/DC converter 7 which has this high electrical capacitance.

In the third-type hybrid power supply system 9 shown in FIG. 3, a capacitor 10 is connected to the inputs of a DC/DC converter 11, and the outputs of the DC/DC converter 11 are connected in parallel to a storage cell 12. The supply of energy to the inverter 4 is carried out by the capacitor 12, and steep energy supply and regeneration is performed by the capacitor 10 via the DC/DC converter 11. The output voltage to the inverter 4 is substantially constant.

With the third-type hybrid power supply system 9, there is the merit that the voltage of the capacitor 10 changes greatly and hence the stored energy of the capacitor 10 can be utilized effectively. However, because of the requirement for a DC/DC converter 11 that has an electrical capacitance equal to that of the inverter 4, the DC/DC converter 11 is large in size and the cost thereof is high. In addition, the efficiency drops in step with the electric power consumption of the DC/DC converter 11 which has this large electrical capacitance. Also, on account of the time lag of the electric power conversion by the DC/DC converter 11, the start of the discharge and absorption of a large current by the capacitor 10 is delayed.

DISCLOSURE OF THE INVENTION

In view of the foregoing, it is accordingly an object of the present invention to provide a high efficiency hybrid power supply system that permits a power type power supply device such as a capacitor to be utilized effectively, and that makes it possible to even the burden on an energy type power supply device such as a storage cell.

It is a further object of the present invention to further reduce the electrical capacitance of a power converter such as a DC/DC converter that is required in order to control the input voltage inputted to the inverter to within the load side inverter input range, in the hybrid power supply system.

The hybrid power supply system according to a first embodiment of the present invention comprises: system voltage lines which are connected to a load, an energy type power supply device connected to the system voltage lines; a power type power supply device connected to the system voltage lines; and system voltage control means that change the voltage of the power type power supply device by changing the voltage of the system voltage lines, and thus allow electric power to be outputted from the power type power supply device to the system voltage lines and electric power to be absorbed by the power type power supply device from the system voltage lines.

In a preferred embodiment, the system voltage control means change the system voltage in accordance with the electric power required by the load. For example, the system voltage control means reduce the system voltage when electric power is to be supplied to the load, and raise the system voltage when electric power is to be fed back from the load.

In a preferred embodiment, the system voltage control means comprise a voltage controller having a variable output voltage; the output terminal of the voltage controller is serially connected to the energy type power supply device; and a body formed by this serial connection is connected to the system voltage lines in parallel with the power type power supply device.

A voltage converter whose input and output are isolated from each other and that operates upon receiving an electric power supply from an energy type power supply device can be used as the voltage controller. Alternatively, a converter whose input and output are isolated/not isolated that operates upon receiving an electric power supply from an additional energy type power supply device provided separately from the energy type power supply device can be used as the voltage controller. In a preferred embodiment that employs the latter converter, there is a power supply defect detector that detects a defect in the electric power supply capacity of the energy type power supply device (failure, deficient storage capacity, for example). When this detector detects a defect in the electric power supply capacity of the energy type power supply device, the energy type power supply device exhibiting this defect is substantially not used and the output voltage of the voltage controller that then operates under the electric power from the additional power supply device is applied substantially directly to the system voltage lines. Hence, even if the energy type power supply device fails or exhibits a deficient storage capacity, operation is able to continue as a result of the electric power from the additional power supply device.

The above-mentioned serially connected body is formed as one module and a plurality of these modules can also be connected in parallel to the system voltage lines. By choosing the number of modules, the desired value for the total current capacity of the hybrid power supply system can be established.

Another constitutional example of the system voltage control means in which a plurality of energy type power supply devices can be selectively connected in series or in parallel can also be adopted.

In this connection, conventionally, in a vehicle power supply and in a variety of other kinds of electric circuit, capacitors are used with the objective of smoothing the power supply voltage. Capacitors are also used with the same objective in conventional hybrid power supplies, the power supply voltage (system voltage) being controlled so as to be substantially constant or to within a narrow voltage range. On the other hand, by actively varying the system voltage, the hybrid power supply system according to the first embodiment of the present invention brings about a large recharge and discharge of a power type power supply device such as a capacitor and is therefore based on a new principle of optimizing the distribution of the load on an energy type power supply device such as a cell and on a power type power supply device such as a capacitor.

The hybrid power supply system according to another embodiment of the present invention comprises: output terminals, a serial/parallel chopper circuit connected between the output terminals, a power type power supply device connected between the output terminals, and a controller for controlling the output voltage of the serial/parallel chopper circuit. The serial/parallel chopper circuit comprises a plurality of energy type power supply devices and switching elements, and the ON/OFF operation of the switching elements causes the plurality of energy type power supply devices to be alternately connected in series and in parallel between the output terminals, and the output voltage, which is at a level that corresponds with the duty of the switching elements, can be outputted to the output terminals. The controller causes the ON/OFF operation by driving the switching elements of the serial/parallel chopper circuit and increases/decreases the level of the output voltage by controlling the duty of the switching elements.

The serial/parallel chopper circuit can further comprise a current path for feeding back electrical energy from the output terminals to the energy type power supply devices. Accordingly, regeneration energy from the load circuit can be fed back to the energy type power supply devices and the energy type power supply devices can be recharged using a charger which is connected to the output terminals. A constitution in which a plurality of energy type power supply devices is serially connected by means of one current path can be adopted or a constitution can be adopted in which a plurality of parallel current paths for individually recharging the plurality of energy type power supply devices is provided. In the latter constitution, the output-terminal side voltage which is required for a regeneration operation and for recharging is lower than the output voltage of the former constitution. Further, also as a result of using, as a regeneration operation and recharging method, a method in which a current is made to flow through an inductor such that energy is temporarily stored therein, a high counter electromotive force is then generated in the inductor by shutting off the current in the inductor, and, under the action of this counter electromotive force, the energy stored in the inductor is forcedly injected into the energy type power supply device, the output terminal voltage required for regeneration and recharging and the like can be reduced. Further, by means of a method for regulating the duty by using switching elements for example, and so forth, the size of the current for the regeneration operation and the recharging and the like can also be controlled.

According to the hybrid power supply system of another embodiment of the present invention, actively varying the output voltage by using the serial/parallel chopper circuit brings about a large recharge/discharge of a power type power supply device such as a capacitor, and, as a result, it is possible to optimize the distribution of the load on an energy type power supply device such as a storage cell and on a power type power supply device such as a capacitor. In this connection, the conventional hybrid power supply is designed to control the output voltage (system voltage) to be substantially constant or to within a narrow voltage range. On the other hand, the operating principle of the hybrid power supply system according to another embodiment of the present invention that brings about a large recharge/discharge of a power type power supply device by actively varying the system voltage is a new one.

BEST MODE FOR CARRYING OUT THE INVENTION

Figure 4:
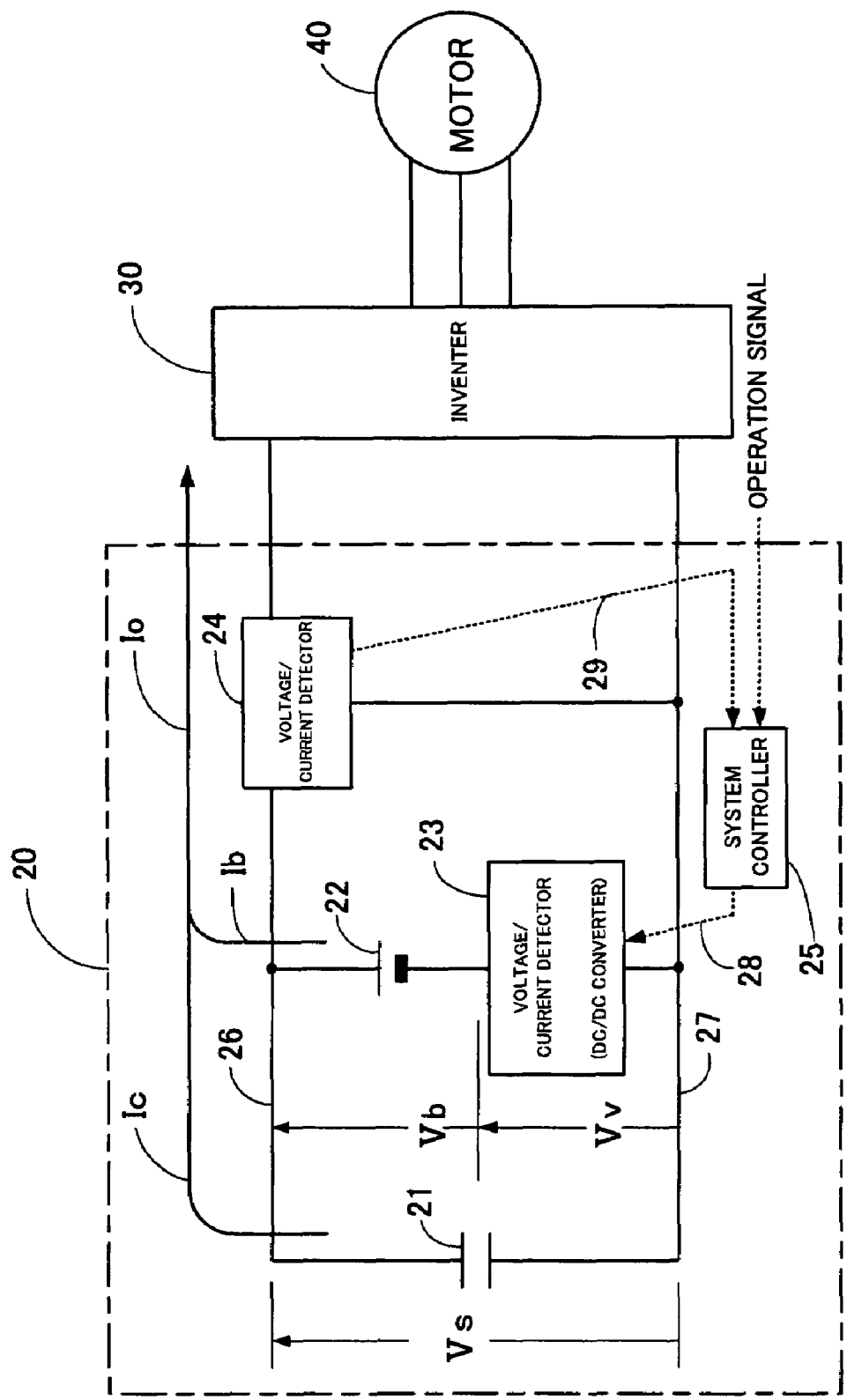
FIG. 4 shows the constitution of the hybrid power supply system according to the first embodiment of the present invention.

FIG. 4 shows the constitution of the hybrid power supply system 20 according to the first embodiment of the present invention.

The hybrid power supply system 20 is used in order to supply DC electric power via an inverter (DC converter) 30 to a three-phase AC motor 40 which is a motive power source of an electric vehicle, electric construction vehicle and the like, for example.

As shown in FIG. 4, in the hybrid power supply system 20, a high capacity storage cell 22 which typifies an energy type power supply device and the output terminal of a voltage controller 23 are connected in series and connected between system voltage lines 26 and 27. In addition, a capacitor 21, which typifies a power type power supply device, is connected between the system voltage lines 26 and 27 in parallel with the above-described serially connected body formed by the storage cell 22 and voltage controller 23. The system voltage lines 26 and 27 are connected to the input terminals of the inverter 30.

The inverter 30 is a DC/AC conversion circuit of a type which has a broad input voltage range that includes the variable range of the system voltage Vs described below and that allows the desired voltage and current to be obtained for the motor 40 irrespective of the value of the input voltage within this range.

The voltage controller 23 is a DC/DC converter, for example, that is constituted to allow this output voltage to be controlled arbitrarily within a predetermined variable range (the input terminals are omitted in FIG. 4). The output voltage of the voltage controller 23 is controlled by a control signal 28 which is applied to the voltage controller 23 by the system controller 25. The system controller 25 inputs a voltage/current detection signal 29 from a voltage/current detector 24 for detecting the system voltage (that is, the output voltage of the power supply system 20) Vs present between the system voltage lines 26 and 27 and an output current Io of this power supply system 20, together with an operation signal that represents an operating state of the load (the inverter 30 and the motor 40) which is inputted by an external circuit that is not shown (for example, a signal that expresses whether the motor 40 is operating or has stopped, whether the motor 40 is subject to a powering operation or a regeneration operation, and expressing the size of the electric power P required by the inverter 30), and the system controller 25 thus controls the output voltage of the voltage controller 23 on the basis of this input signal.

In such a constitution, the system voltage (output voltage) Vs is a voltage produced by adding together the output voltage Vb of the storage cell 22 and the output voltage Vv of the voltage controller 23. The output voltage Vb of the storage cell 22 is substantially constant but the output voltage Vv of the voltage controller 23 can be varied arbitrarily. Hence, the system voltage Vs is also variable within a variable width that is substantially equal to the variable width of the output voltage Vv of the voltage controller 23. This variable system voltage (output voltage) Vs is also the voltage across the capacitor 21. Therefore, the capacitor 21 can discharge energy to the inverter 30 and absorb energy from the inverter 30 in an amount that corresponds with the variable width of the system voltage Vs.

A description will now be provided using a simple numerical value example. The assumption is made that the output voltage Vb of the storage cell 22 is substantially fixed at 200[V], for example. It is also assumed that the output voltage Vv of the voltage controller 23 is variable within the range 0[V] to 200[V], for example. The system voltage Vs can thus be varied within the range from 200[V] to 400[V]. Therefore, when the static capacitance of the capacitor 21 is 'C', the maximum energy Qmax that can be stored by the capacitor 21 and the energy Qc that can be discharged and absorbed by the capacitor 21 according to the voltage control by the voltage controller 23 are:

$$Q\max = \tfrac{1}{2} \times C \times 400^2$$

$$Qc = 1/2 \times C \times (400^2 - 200^2)$$

Therefore, in this simple example, the energy Qc that can be used as a result of discharge from or absorption by the capacitor 21 reaches 75% of the maximum energy Qmax that can be stored by the capacitor 21.

As can be seen from the above example (which is not actually quite so simple), according to the hybrid power supply system 20 shown in FIG. 4, the benefit is afforded that the usage efficiency of the capacitor 21 is extremely high.

When this benefit arises, the voltage control of the voltage controller 23 can be performed as follows, for example. In other words, when a large amount of electric power must be supplied to the motor 30 during powering of the motor 30, the voltage Vv of the voltage controller 23 drops. As a result, the system voltage (the voltage of the capacitor 21) Vs drops, and, as a result of this voltage drop, the energy Qc that remains in the capacitor 21 is discharged from the capacitor 21 and supplied to the inverter 30. Also, when a large amount of electric power must be fed back from the motor 40 during regeneration of the motor 40, the voltage Vv of the voltage controller 23 is raised. As a result, the system voltage (the voltage of the capacitor 21) Vs rises, and, as a result of this voltage rise, the energy Qc that is deficient in the capacitor 21 is fed back from the inverter 30 to the capacitor 21.

Thus, by increasing/decreasing the system voltage (voltage of the capacitor 21) Vs in accordance with the size of the electric power required by the inverter 30, the current Ic of the capacitor 21 is changed markedly, whereby a large amount of electric power can be supplied from the capacitor 21 to the inverter 30 or conversely fed back from the inverter 30 to the capacitor 21. Accordingly, the output current Ib (output power) of the storage cell 22 does not fluctuate greatly and hence the burden on the storage cell 22 is made even and ideally the average value of the severely fluctuating load required by the inverter 30 is outputted.

Figure 1:
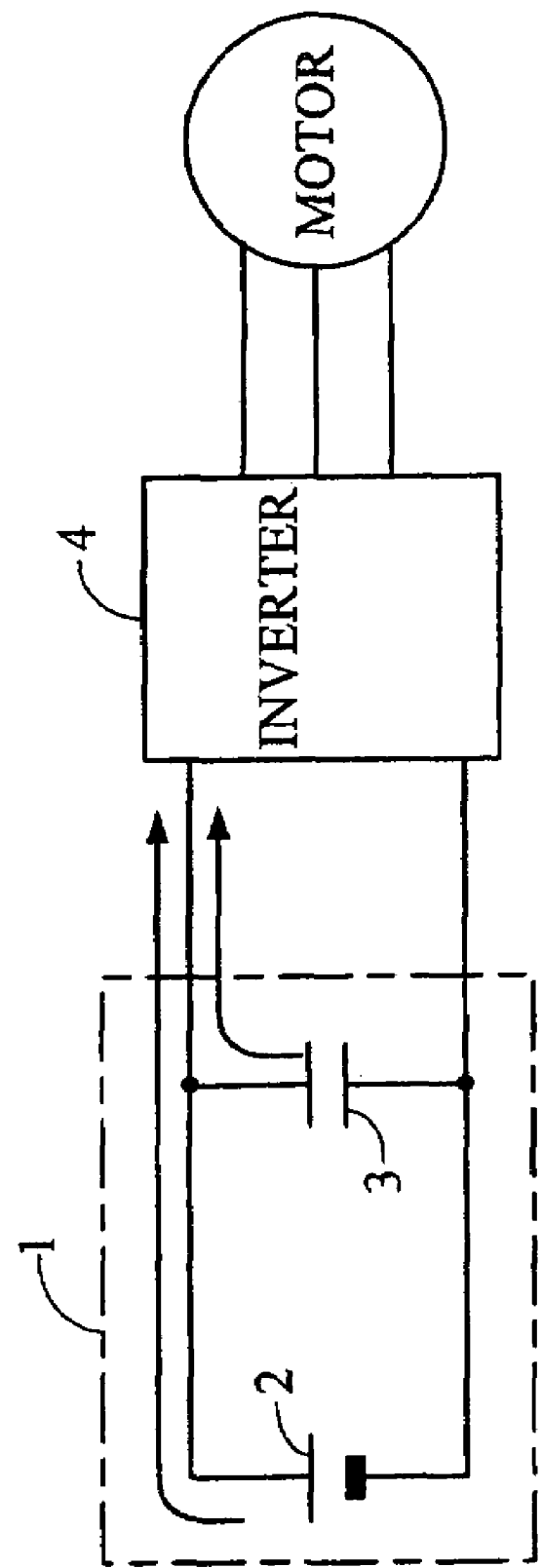
FIG. 1 is a block diagram showing a constitutional example of a conventional hybrid power supply system.
Figure 2:
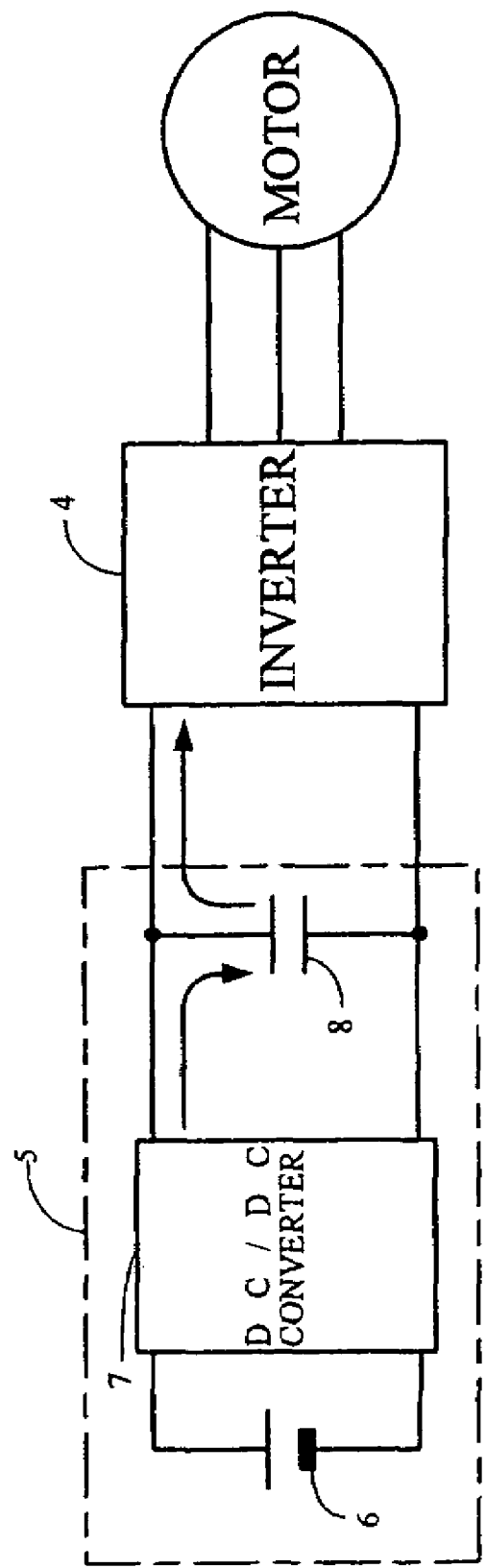
FIG. 2 is a block diagram showing another constitutional example of a conventional hybrid power supply system.
Figure 3:
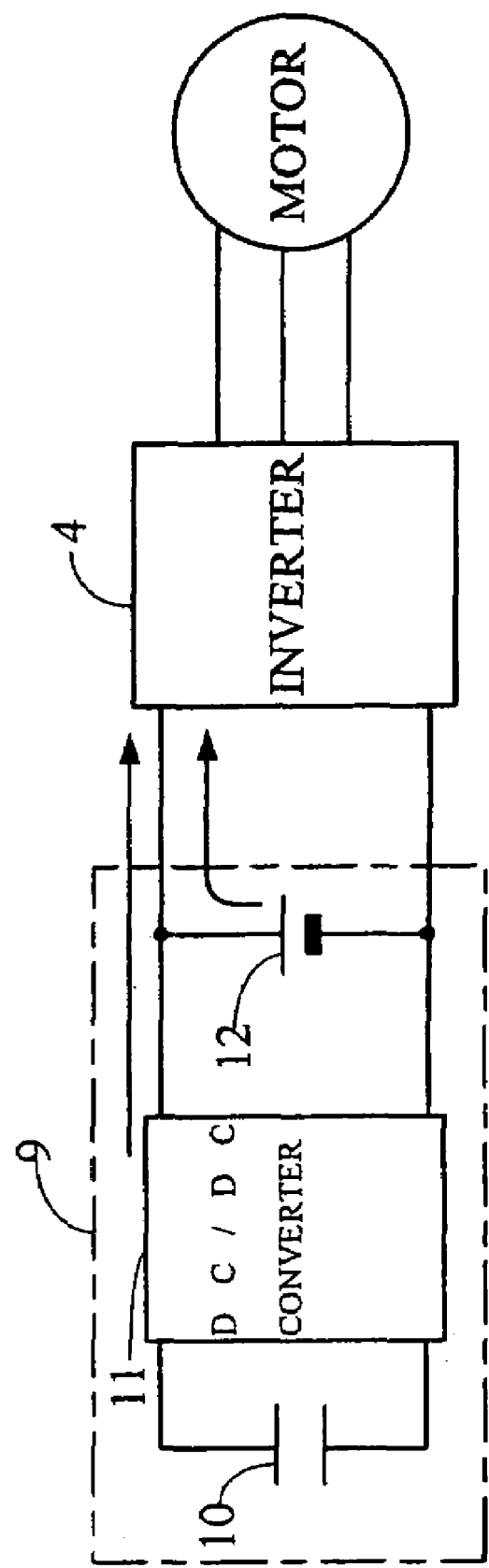
FIG. 3 is a block diagram showing yet another constitutional example of a conventional hybrid power supply system.

Further, according to the hybrid power supply system 20 shown in FIG. 4, because the capacitor 21 is connected to the inverter 30 without the interposition of a DC/DC converter, the problem which involves a response delay caused by the interposition of a DC/DC converter as in the conventional system 9 shown in FIG. 3 does not exist. In addition, the system voltage Vs is divided into the voltage Vb of the storage cell 22 and the output voltage Vv of the voltage controller 23. Therefore, the electrical capacitance of the voltage controller 23 is then less than the electric power supplied to the serially connected body formed by the storage cell 22 and voltage controller 23, and a large current does not flow as a result of the load being made even, meaning that this electrical capacitance is far smaller than the electrical capacitance of the inverter 30. For this reason, the decline in efficiency that results from the size, cost and electric power consumption of the voltage controller 23 is smaller than that of the DC/DC converter of either of the conventional systems 5 and 9 shown in FIGS. 2 and FIG. 3 respectively.

Figure 5:
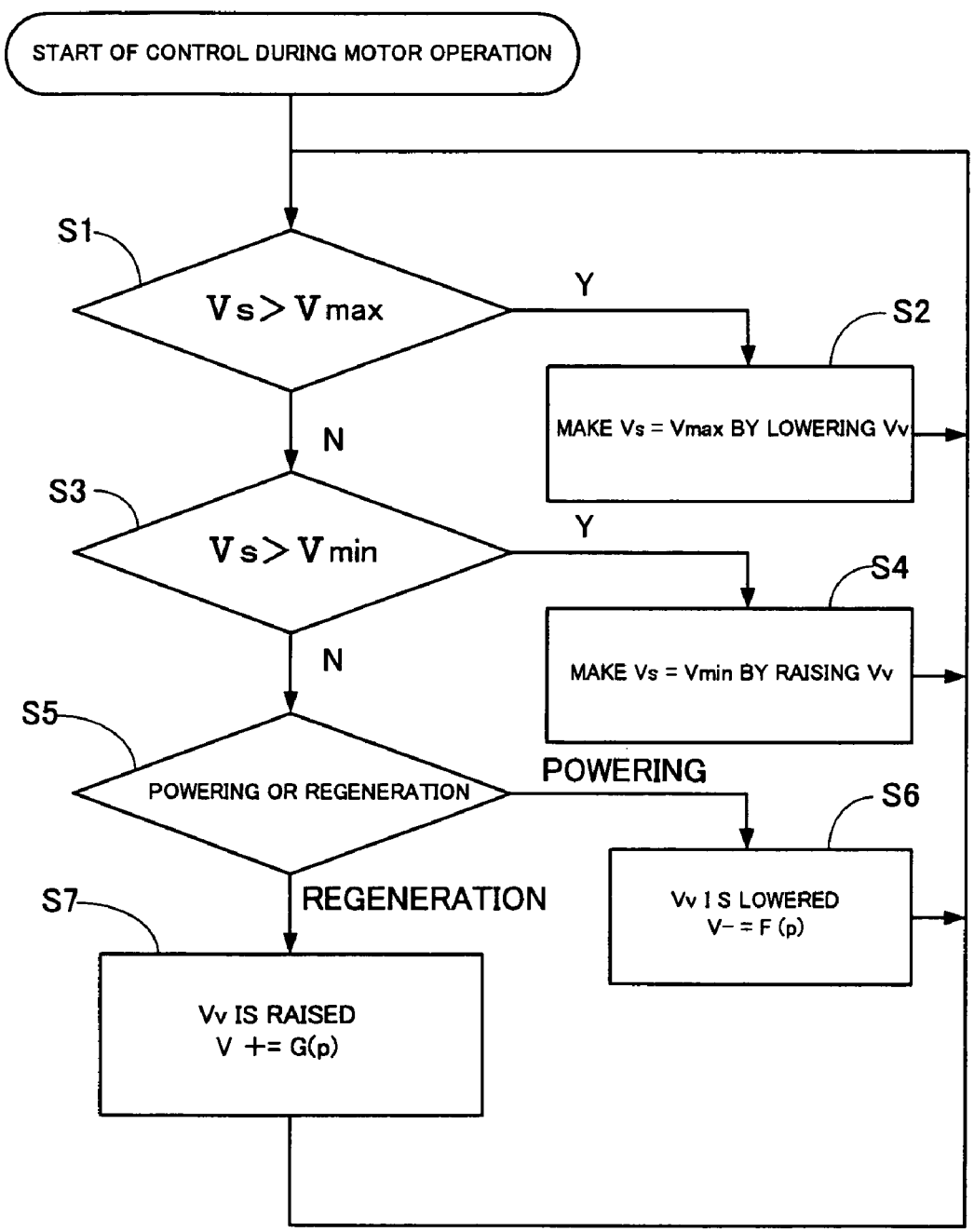
FIG. 5 is a flowchart showing an example of voltage control performed by a system controller 25 during operation of a motor 40, in the hybrid power supply system 20 shown in FIG. 4.
Figure 6:
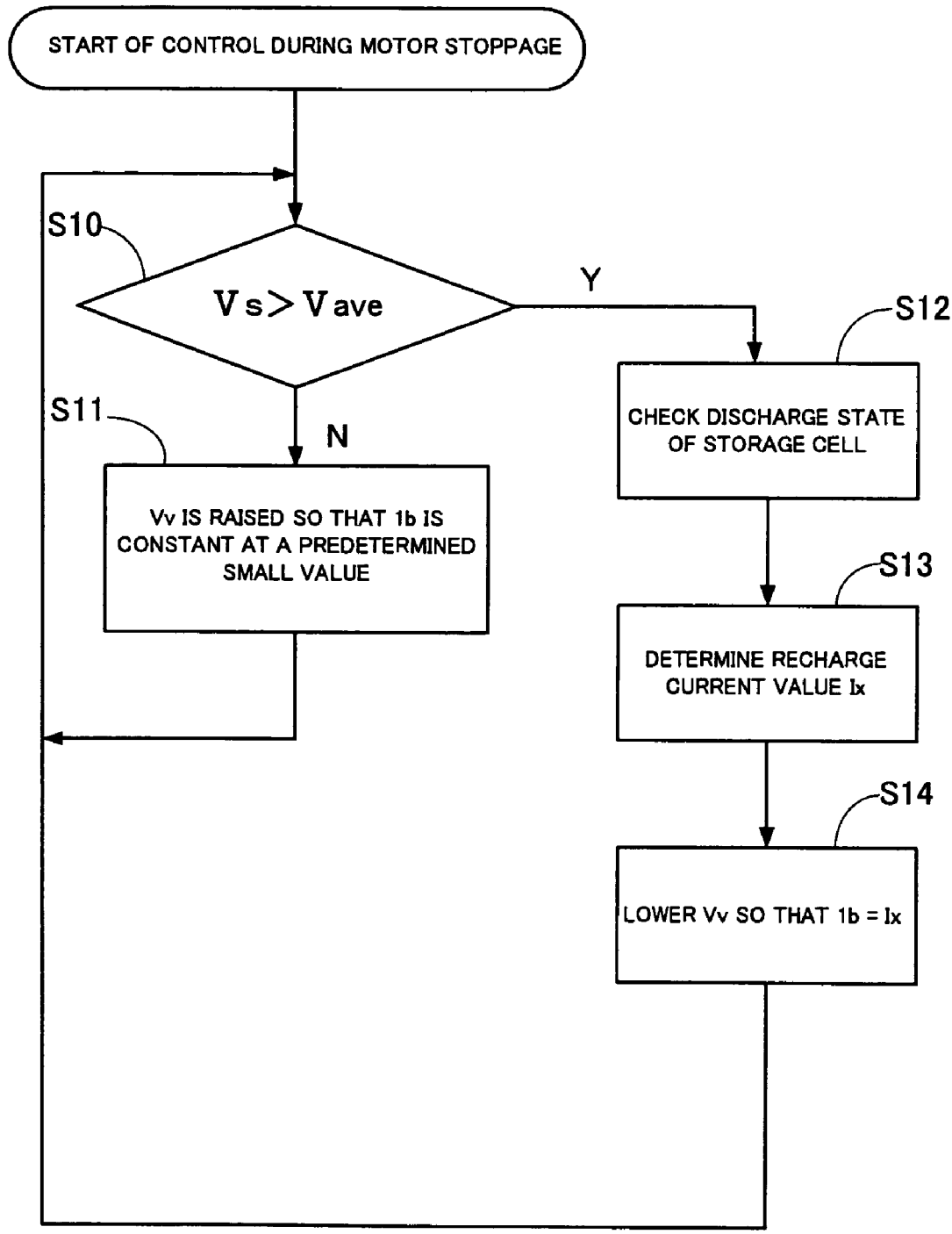
FIG. 6 is a flowchart showing an example of voltage control performed by the system controller 25 when the motor 40 has stopped, in the hybrid power supply system 20 shown in FIG. 4.

FIGS. 5 and 6 show examples of the voltage control operation of the system controller 25 in the hybrid power supply system 20 shown in FIG. 4. FIG. 5 shows an example of voltage control carried out during operation of the motor 40. FIG. 6 shows an example of voltage control performed when the motor 40 has stopped.

As shown in FIG. 5, during operation of the motor 40, the system controller 25 regulates the voltage Vv of the voltage controller 23 (steps S1, S2, S3, and S4) to counteract a rise in the system voltage Vs (=Vb+Vv) above a predetermined maximum voltage Vmax and a fall in this voltage below a predetermined minimum value Vmin. During this regulation, because a state is assumed in which it is not possible to make even the burden on the storage cell 22 (not controllable), the electric power required by the inverter 30 is supplied by the storage cell 22, or, conversely, the electric power fed back from the inverter 30 is absorbed by the storage cell 22. Here, the maximum voltage Vmax and the minimum voltage Vmin for the system voltage Vs are a maximum value and a minimum value in a variable range considered to be appropriate for the application, within the variable range of the system voltage Vs which can be varied through control of the voltage Vv of the voltage controller 23, for example.

Thus, the system voltage Vs is controlled in a range between the predetermined maximum voltage Vmax and minimum voltage Vmin as described above, and the system controller 25 also judges whether the operating state of the motor 40 is a powering state or a regeneration state on the basis of the above-described operation signal and the like (S5). Then, during a powering operation, the system controller 25 reduces the voltage Vv of the voltage controller 23 so as to supply electric power from the capacitor 21 to the inverter 30 (S6). The drop rate (or drop amount) V− of the voltage Vv at this time is determined as a predetermined function F (P) of the electric power P required by the inverter 30, for example. On the other hand, during a regeneration operation, the system controller 25 absorbs electric power from the inverter 30 to the capacitor 21 (S7) by raising the voltage Vv of the voltage controller 23. The climb rate (or rise amount) V+ of the voltage Vv at such time is determined as a predetermined function G (P) of the electric power P required by the inverter 30, for example. By means of control, implementation is possible in which the storage cell 22 continually outputs a fixed voltage and the extent of the fluctuation in the load of the inverter 30 can be handled by the capacitor 21.

As shown in FIG. 6, when the motor 40 has stopped, the system controller 25 compares the system voltage Vs and the predetermined appropriate voltage Vave (S10). Here, the appropriate voltage Vave for the system voltage Vs is a voltage that facilitates the transition to both a powering operation and to a regeneration operation and is a system voltage value that corresponds with a center value in the variable range of the system voltage Vs resulting from control of the voltage Vv, for example, or a system voltage value that corresponds with a center value in the variable range for the stored energy of the capacitor 21 that corresponds with the variable range of the system voltage Vs.

As a result of the above comparison, when the system voltage Vs is lower than the appropriate voltage Vave, the system controller 25 raises the voltage Vv of the voltage controller 23, and the capacitor 21 is accordingly recharged by the storage cell 22 such that the system voltage Vs approaches the appropriate voltage Vave (S11). Here, the climb rate (or rise amount) of the voltage Vv is controlled so that the current Ib of the storage cell 22 is a predetermined small value which is appropriate in terms of the characteristics of the storage cell 22.

On the other hand, as a result of the above comparison of step S10, when the system voltage Vs is higher than the appropriate voltage Vave, the system controller 25 checks the discharge state of the storage cell 22 using a commonly known checking method and so forth (S12), and calculates the appropriate recharge current Ix for the storage cell 22 (S13) according to this discharge state by using a pre-prepared lookup table and the like, for example. Thereafter, the system controller 25 lowers the voltage Vv of the voltage controller 23 and, as a result, the remaining charge is discharged from the capacitor 21 to recharge the storage cell 22 (S14). Here, the drop rate (or drop amount) of the voltage Vv is controlled so that the recharge current Ib for the storage cell 22 equals the appropriate value Ix as determined in step S13.

Figure 7:
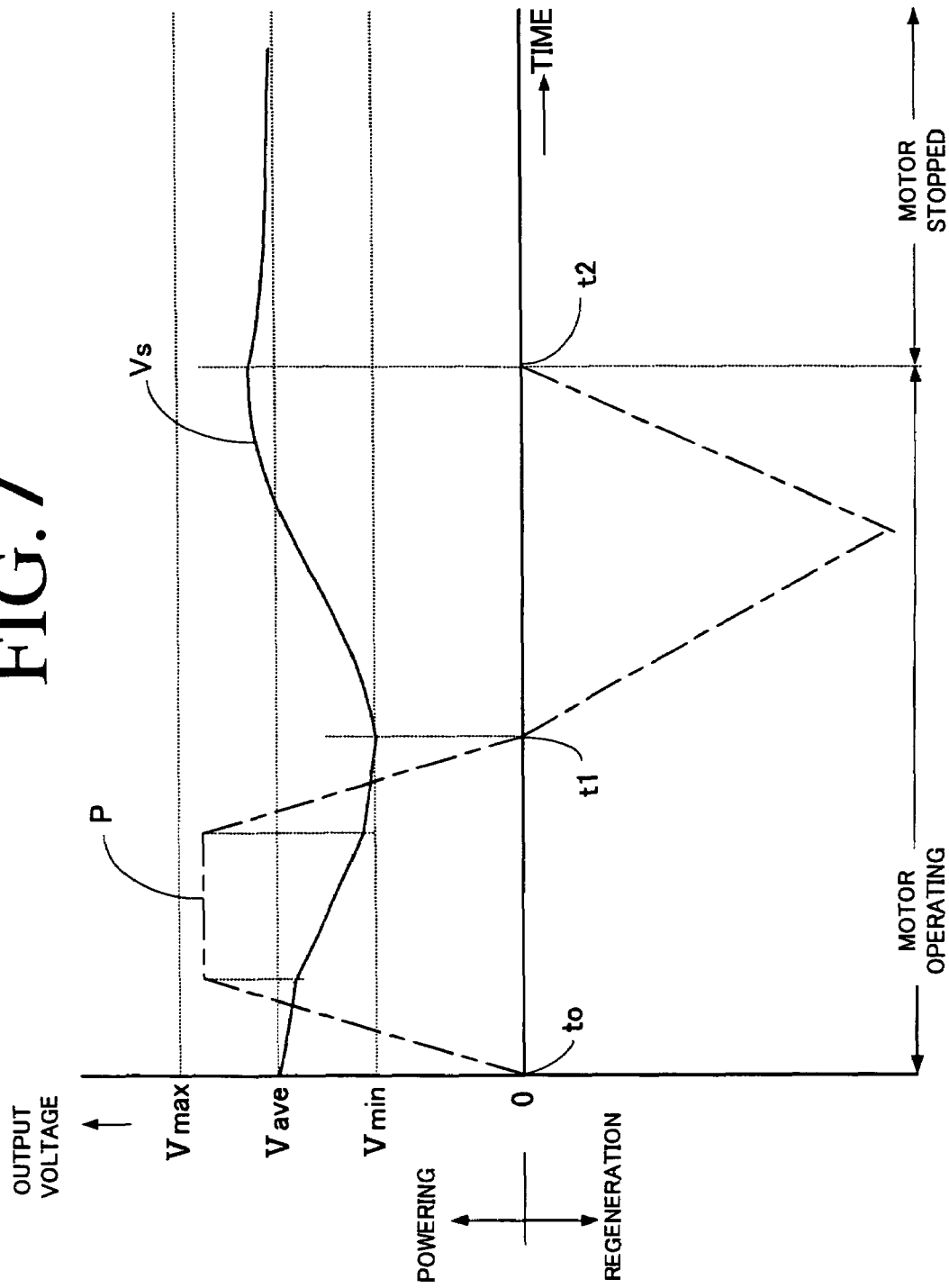
FIG. 7 shows in outline an example of the change in the system voltage Vs with respect to time as a result of the voltage control shown in FIGS. 5 and 6.

FIG. 7 shows in outline an example of the change in the system voltage Vs with respect to time as a result of the voltage control shown in FIGS. 5 and 6.

The dot-dashed line in FIG. 7 denotes the electric power P which is required by the inverter 30. The positive interval (t0 to t1) of the electric power P is the interval in which the motor 40 is subject to a powering operation, the negative interval (t1 to t2) of the electric power P is the interval in which the motor 40 is subject to a regeneration operation, and the zero interval (t2 and beyond) of the electric power P is the interval in which the motor 40 has stopped.

As shown in FIG. 7, in the powering operation interval (t0 to t1), for example, the system voltage Vs is reduced at a drop rate that corresponds with the magnitude of the electric power P which is to be supplied to the inverter 30. The electric power is accordingly outputted by the capacitor 21 and then supplied to the inverter 30. Further, in the regeneration operation interval (t1 to t2), for example, the system voltage Vs is raised at a climb rate that corresponds with the magnitude of the electric power P which is to be fed back from the inverter 30. The electric power fed back from the inverter 30 is then accordingly absorbed by the capacitor 21.

In the motor stoppage interval (t2 and beyond), when the system voltage Vs is higher than the appropriate voltage Vave as shown, the system voltage Vs is caused to drop toward the appropriate voltage Vave. As a result, the capacitor 21 recharges the storage cell 22. Although not illustrated, when the system voltage Vs is lower than the appropriate voltage Vave, the system voltage Vs is made to rise toward the appropriate voltage Vave. As a result, the storage cell 22 recharges the capacitor 21.

Figure 8:
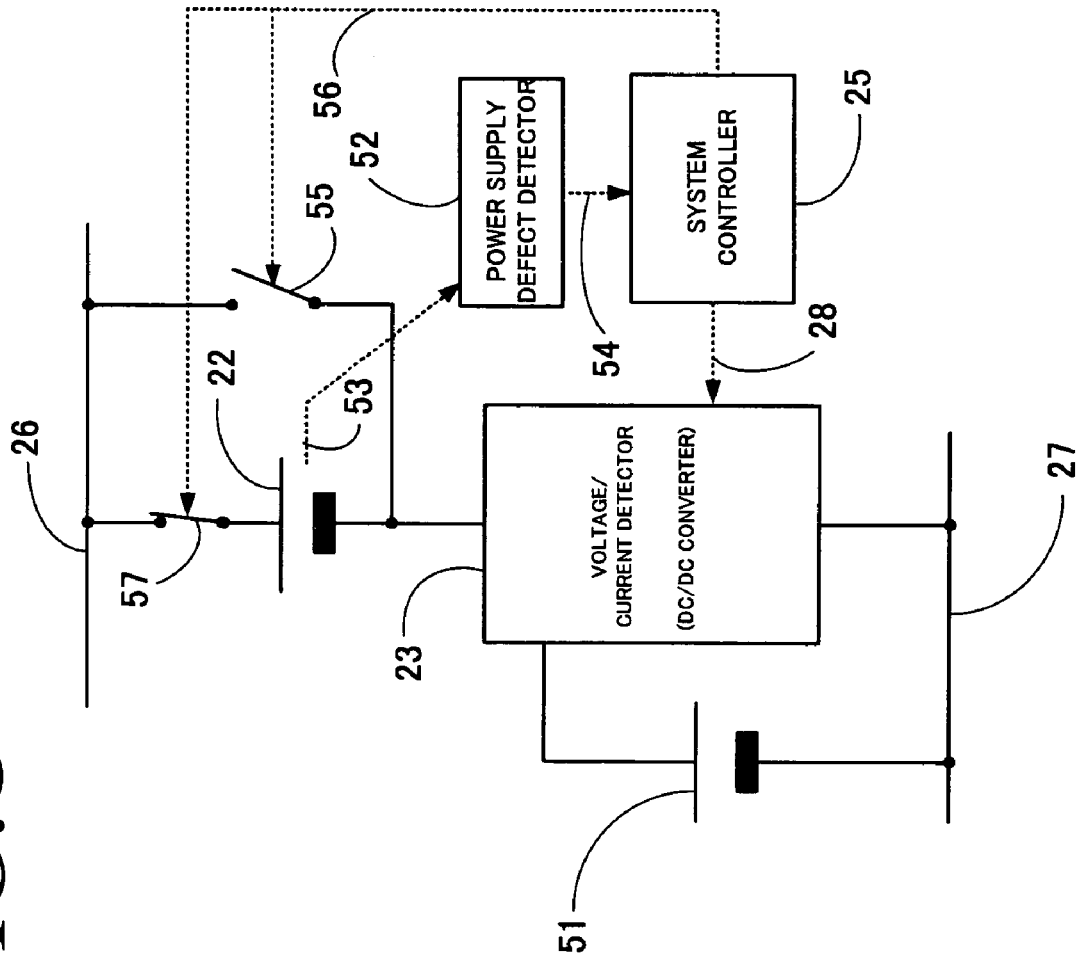
FIG. 8 is a circuit diagram showing a constitutional example of a relief circuit that operates when the input circuit of the voltage controller 23 and the storage cell 22 are defective.
Figure 9:
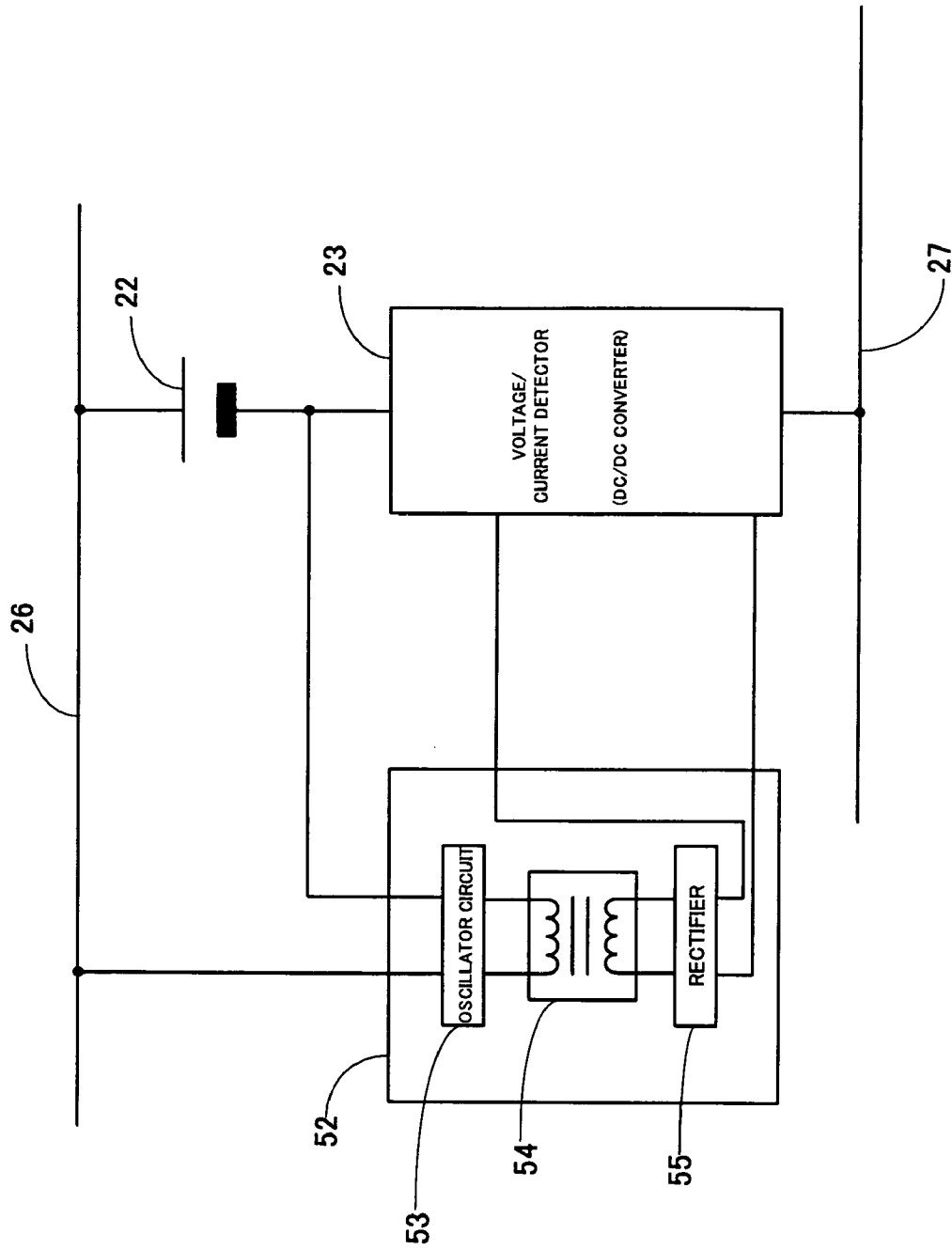
FIG. 9 is a circuit diagram showing another constitutional example of the input circuit of the voltage controller 23.

FIGS. 8 and 9 show two kinds of constitutional example for the input circuit of the voltage controller 23 in the hybrid power supply system 20 shown in FIG. 4.

In the example shown in FIG. 8, the voltage controller 23 is a DC/DC converter that has an auxiliary storage cell 51 connected to an input terminal thereof, and operates under the electric power from this auxiliary cell 51. The auxiliary cell 51 may have a smaller capacity than the storage cell (main cell) 22 that constitutes the main power supply for supplying electric power to the inverter 30. The output voltage of the auxiliary cell 51 (that is, the input voltage of the voltage controller 23) may exceed or be lower than the highest value in the variable range of the output voltage of the voltage controller 23. In cases where the output voltage of the auxiliary cell 51 exceeds the highest value of the output voltage of the voltage controller 23, a breakdown-voltage type DC/DC converter such as a breakdown voltage chopper circuit, for example, can be adopted as the voltage controller 23. Conversely, in cases where the output voltage of the auxiliary cell 51 is lower than the highest value of the output voltage of the voltage controller 23, a step-up type DC/DC converter, such as a step-up chopper circuit, for example, can be adopted as the voltage controller 23. In the latter case, the step-up type DC/DC converter desirably also possesses a breakdown voltage function in order that the output voltage of the voltage controller 23 can be varied as far as a voltage range lower than the output voltage of the auxiliary cell 51.

FIG. 8 also shows a relief circuit that operates when the electric power supply capacity of the storage cell 22 is defective (during failure, deficient storage capacity, and so forth, for example).

In other words, a switch 55 is connected between the terminals of the main cell 22. Further, the switch 55 is controlled by the system controller 25 and is open as shown in the figure during normal operation of the main cell 22. Further, an additional switch 57 is interposed between the main cell 22 and the system voltage line 26. This switch is also controlled by the system controller 25 and is closed as shown in the figure during normal operation of the main cell 22. Also, the power supply defect detector 52 monitors a state 53 which represents the capacity of the storage cell 22 to supply electric power such as the output voltage thereof, and upon judging that the storage cell 22 has switched from this state 53 such that the electric power supply capacity of the storage cell 22 is now defective (due to deficient storage capacity, failure, and so forth, for example), the power supply defect detector 52 outputs a detection signal 54 to the system controller 25.

By way of response to this detection signal 54, the system controller 25 opens the switch 57 and then closes the switch 55. Because the switch 57 opens, the defective main cell 57 is then disconnected from the system voltage lines 26 and 27, and thus not used for operation. Also, because the switch 55 is closed, the output terminal of the voltage controller 23 is directly connected to the system voltage lines 26 and 27, thereby bypassing the defective main cell 22. Subsequently, the system controller 25 controls the output voltage of the voltage controller 23 as indicated by the arrow 28 so that operation is performed using the electric power outputted by the voltage controller 23 which is operated by the auxiliary cell 51, without using the main cell 57. Thus, even in a case where the main cell 22 can no longer be used, provided that the capacity of the auxiliary cell 51 continues, operation is able to continue.

In the example shown in FIG. 9, the voltage controller 23 is a DC/DC converter and a drive voltage is inputted thereto from the main cell 22 via a DC voltage conversion circuit 52. The DC voltage conversion circuit 52 is of the type whose input and output are electrically isolated from each other. The DC voltage conversion circuit 52 is a ringing choke converter, for example. As shown in the figure, the DC voltage from the main cell 22 is converted into an AC voltage by an oscillator circuit 53, this AC voltage being converted into an AC voltage which is isolated from the input side, a primary/secondary isolation transformer 54, whereupon this AC voltage is converted into a DC voltage by a rectifier 55 before being inputted to the voltage controller 23. In this example, as described above, the power conversion circuit, which comprises the DC voltage conversion circuit 52 and the voltage controller 23 is constituted with the input and output isolated from each other. On the other hand, the voltage controller 23 in the constitution shown in FIG. 8 has the auxiliary cell 51 as a power supply in addition to the main cell 22 and hence need not be of the type whose input and output are isolated, and may instead be a non-isolated type voltage controller.

FIG. 10 shows a constitutional example that serves to permit the system voltage Vs to be varied without the use of a DC/DC converter, in the hybrid power supply system 20 shown in FIG. 4.

Figures 10A, 10B:
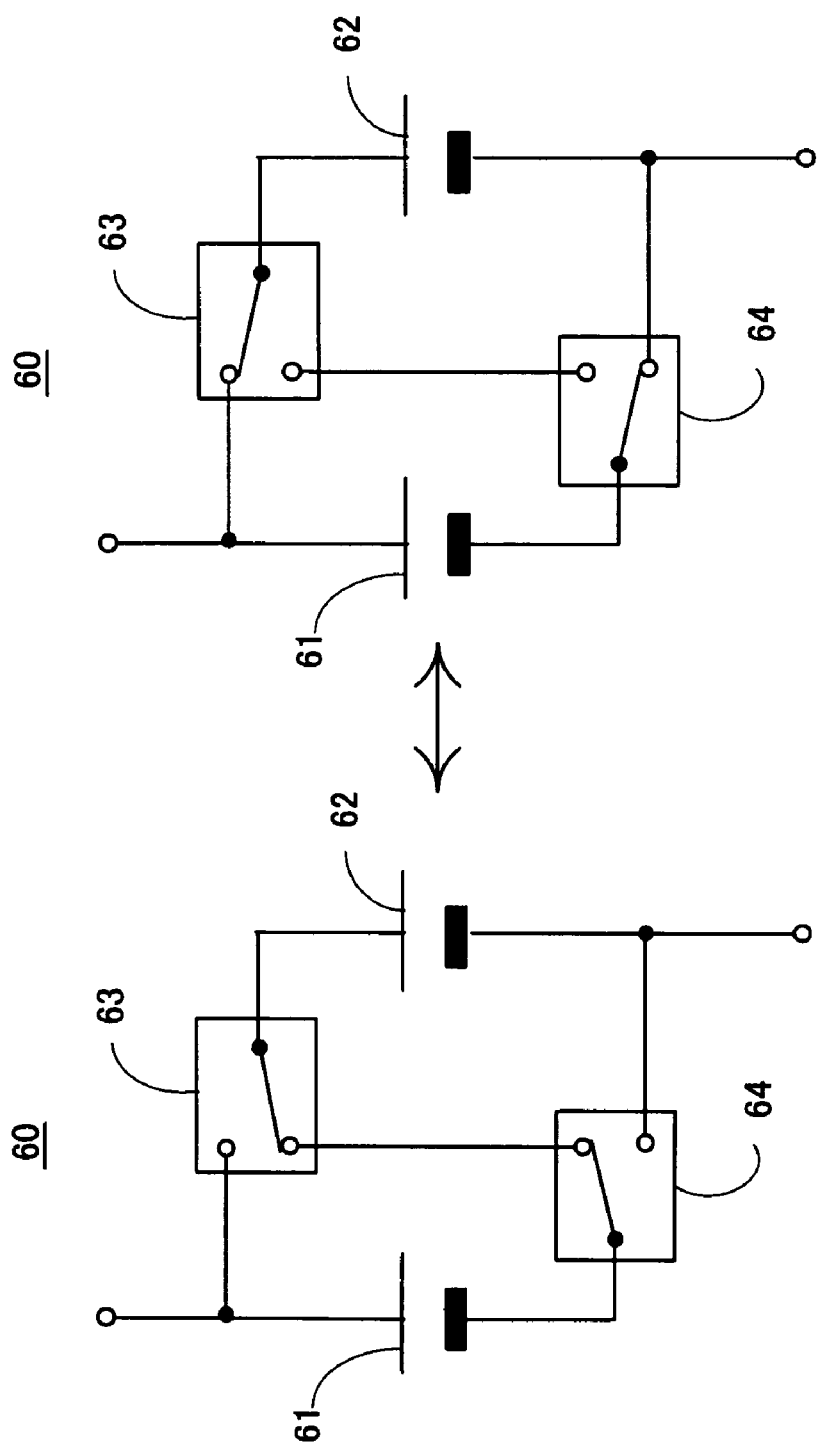
FIG. 10 is a circuit diagram showing a constitutional example that serves to permit the system voltage Vs to be varied by switching storage cell connections.

The circuits 60 shown in FIG. 10 combine two storage cells 61 and 62 and switches 63 and 64, such that by switching the connection states of the switches 63 and 64, the two storage cells 61 and 62 can be connected in series as shown in FIG. 10A and connected in parallel as shown in FIG. 10B. Operation of the switches 63 and 64 can be performed by the system controller 25 shown in FIG. 4. As far as the number of combined storage cells is concerned, two are shown in FIG. 10 but there could be three or more thereof. A circuit in which an individual storage cell combination circuit 60 of this kind or a plurality thereof is/are connected in series can be used in the hybrid power supply system 20 shown in FIG. 4 in place of the serially connected body formed by the storage cell 22 and the voltage controller 23, or in place of the voltage controller 23. As a result, the system voltage Vs can be changed, albeit stepwise, whereby the stored energy of the capacitor 21 can be utilized effectively in the same way as the case described above in which a voltage controller 23 is used.

Figure 11:
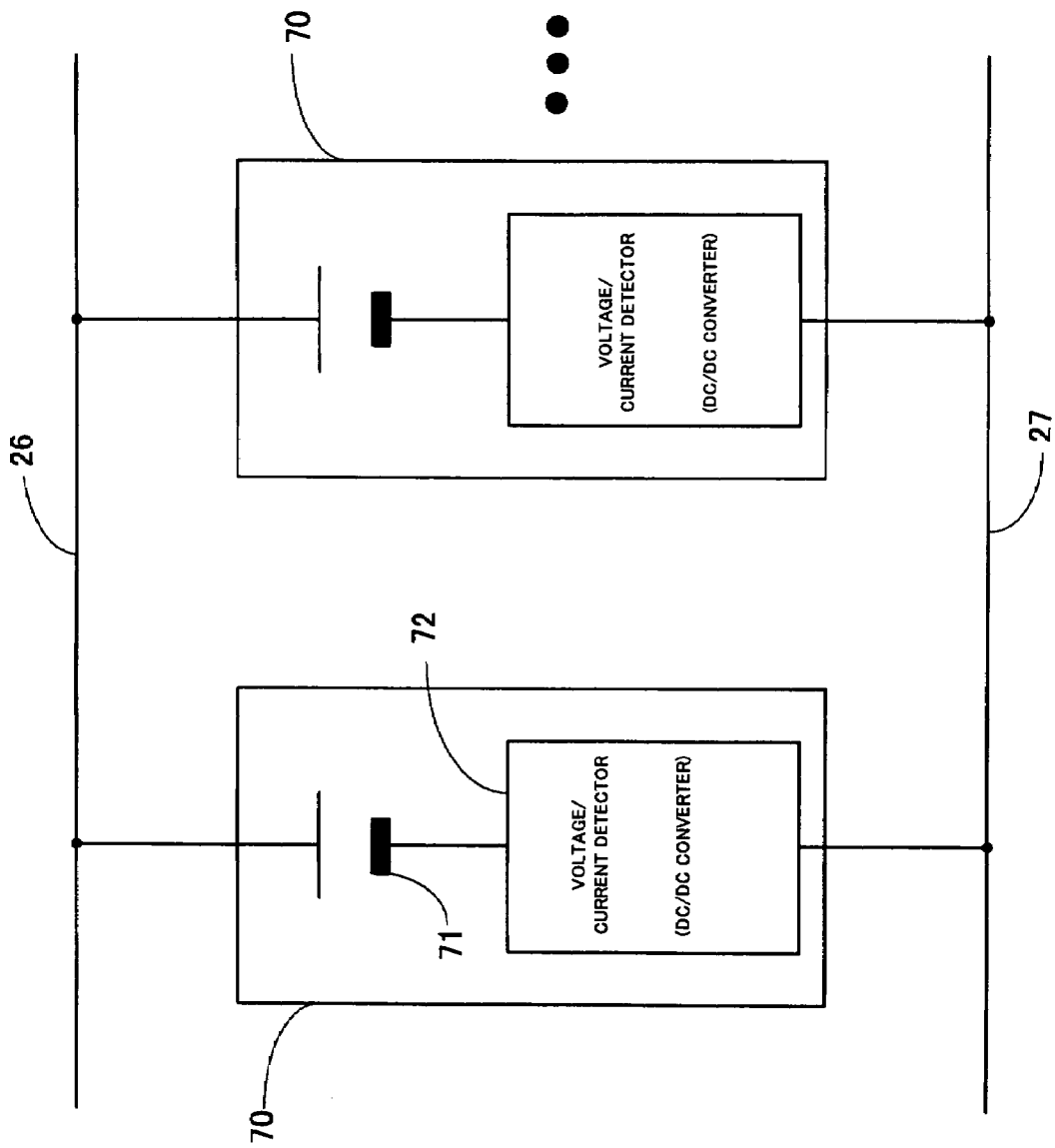
FIG. 11 is a block diagram showing a constitutional example that uses a cell module 70 in which a storage cell 72 and a voltage controller 72 are connected in series.

FIG. 11 shows another constitutional example that serves to vary the system voltage Vs in the hybrid power supply system 20 shown in FIG. 4.

As is shown in FIG. 11, one or a plurality of the cell modules 70, 70 are connected in parallel between the system voltage lines 26 and 27. The cell modules 70 are constituted such that a cell 71 and the output terminal of a voltage controller 72 are connected in series and is desirably a single unit or a single package. The voltage controller 72 is, for example, a DC/DC converter of which the output voltage is variable, all states of this output voltage being controlled by the system controller 25. The number of cell modules 70 connected in parallel is suitably chosen based on the total current capacity of the hybrid power supply system 20. In other words, the larger the total capacity, the higher the number of cell modules 70 connected in parallel.

Further, the drive power of the voltage controller 72 in the cell modules 70 may be supplied by an auxiliary cell (although not illustrated by FIG. 11, this auxiliary cell may be provided in the cell modules 70 or outside the cell modules 70) which is provided separately from the storage cell 71, as shown in FIG. 8, or, as shown in FIG. 9, may be supplied by the storage cell 71 via a voltage conversion circuit (although not shown in FIG. 11, this voltage conversion circuit may be provided in the cell modules 70 or outside the cell modules 70). In the former case, in addition to the auxiliary cell, the voltage defect detector and switches, and the like (not shown in FIG. 11) of the relief circuit shown in FIG. 8 that operates when the storage cell 71 is defective may also be provided in the cell modules 70.

Because there is generally a large amount of variation in the characteristics (impedance and so forth) of individual storage cells 71, when a plurality of the storage cells 71 are connected in parallel, there is the problem that the load inclines toward a partial storage cell 71, which is not preferable. However, according to the constitution shown in FIG. 11, because the variation in the characteristics of the storage cells 71 can be absorbed by regulating the states of the voltage controllers 72 of the cell modules 70 and the characteristics of the cell modules 70, 70 can thus be made uniform, no problems are posed when a plurality of the cell modules 70, 70 are connected in parallel. Further, by choosing the number of the cell modules 70 connected in parallel, the total capacity of the hybrid power supply system 20 can be set to the desired value.

Figure 12:
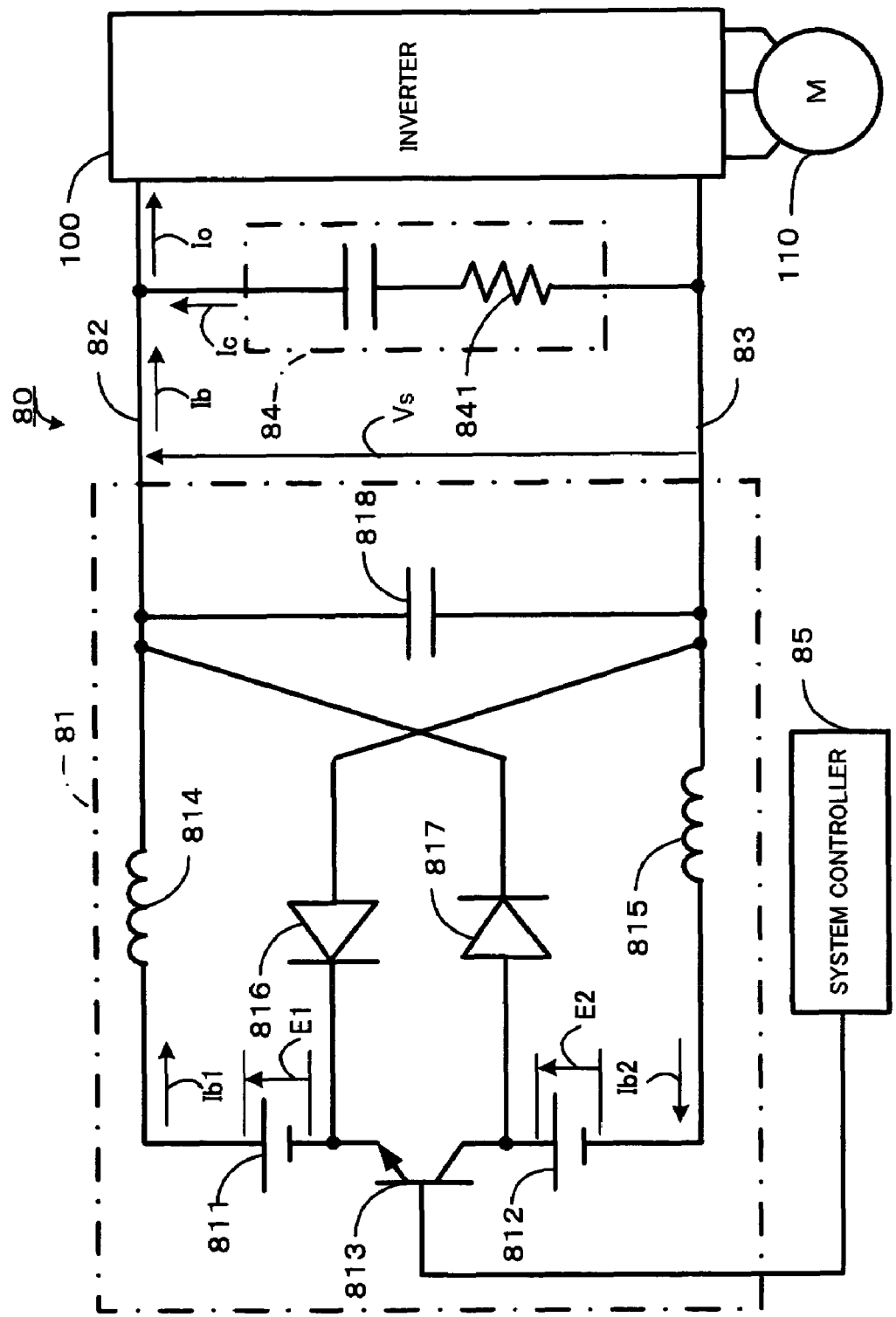
FIG. 12 is a circuit diagram showing the constitution of a hybrid power supply system according to another embodiment of the present invention.

FIG. 12 shows the constitution of a hybrid power supply system 80 according to another embodiment of the present invention.

This hybrid power supply system 80 may be used to supply a DC current via an inverter (DC/AC converter) 100 to a three-phase AC motor 110 which is a motive power source for an electric vehicle, electric construction vehicle, and the like, for example.

As shown in FIG. 12, the hybrid power supply system 20 comprises a cell module 81 which is an energy type power supply device. This cell module 81 has the constitution of a serial/parallel chopper circuit of which the output voltage can be varied steplessly. The output terminals of this cell module 81 are connected to the system voltage lines 82 and 83 and the system voltage lines 82 and 83 are connected to the input terminals of the inverter 100. Further, a capacitor module 84, which is a power type power supply device, is connected between the system voltage lines 82 and 83 in parallel with the cell module 81. In addition, a system controller 85 is connected to the cell module 81 and the system controller 85 controls the output voltage of the cell module 81, and hence controls the output voltage of the hybrid power supply system 80.

The cell module 81 is constituted as a serial/parallel chopper circuit and comprises two large-capacity storage cells 811 and 812 that typify an energy type power supply device. The voltages E1 and E2 of these two storage cells 811 and 812 respectively are equal (that is, E1=E2=E). Further, a switching element, such as a transistor 813, for example, which serves to disconnect or serially connect the two storage cells 811 and 812, is provided and is driven ON/OFF in a high-speed cycle by the system controller 85. In other words, the emitter-collector path of the transistor 813 connects between the negative terminal of the first storage cell 811 and the positive terminal of the second storage cell, the base of the transistor being connected to the drive output terminal of the system controller 85. Further, the positive terminal of the first storage cell 811 is connected to the positive output terminal (that is, the positive system voltage line 82) of the cell module 81 via a first inductor 814, while the negative terminal of the second storage cell 812 is connected to the negative output terminal (that is, the negative system voltage line 83) of the cell module 81 via a second inductor 815. In addition, connected between the negative output terminal of the cell module 81 and the negative terminal of the first storage cell 811 is a first diode 816 so as to establish a flow in a forward direction from the former toward the latter, while connected between the positive output terminal of the cell module 81 and the positive terminal of the second storage cell 812 is a second diode 817 so as to establish a flow in a forward direction from the latter toward the former. In addition, a condenser 818, which serves to remove noise from the output voltage of the cell module 81, is connected between the positive and negative output terminals of the cell module 81.

Figure 13:
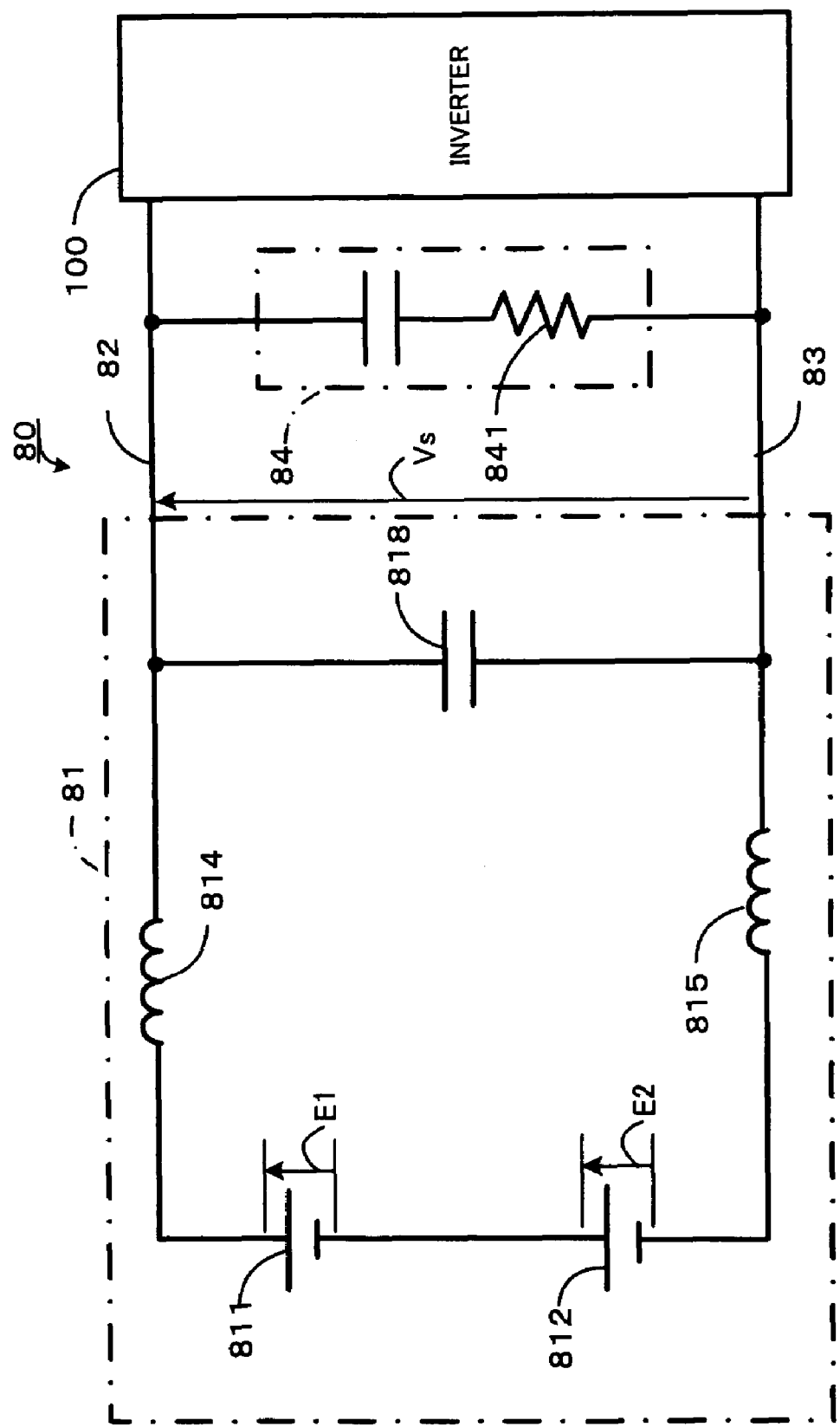
FIG. 13 is a circuit diagram showing a condition in which storage cells are serially connected in the cell module of the system in FIG. 12.
Figure 14:
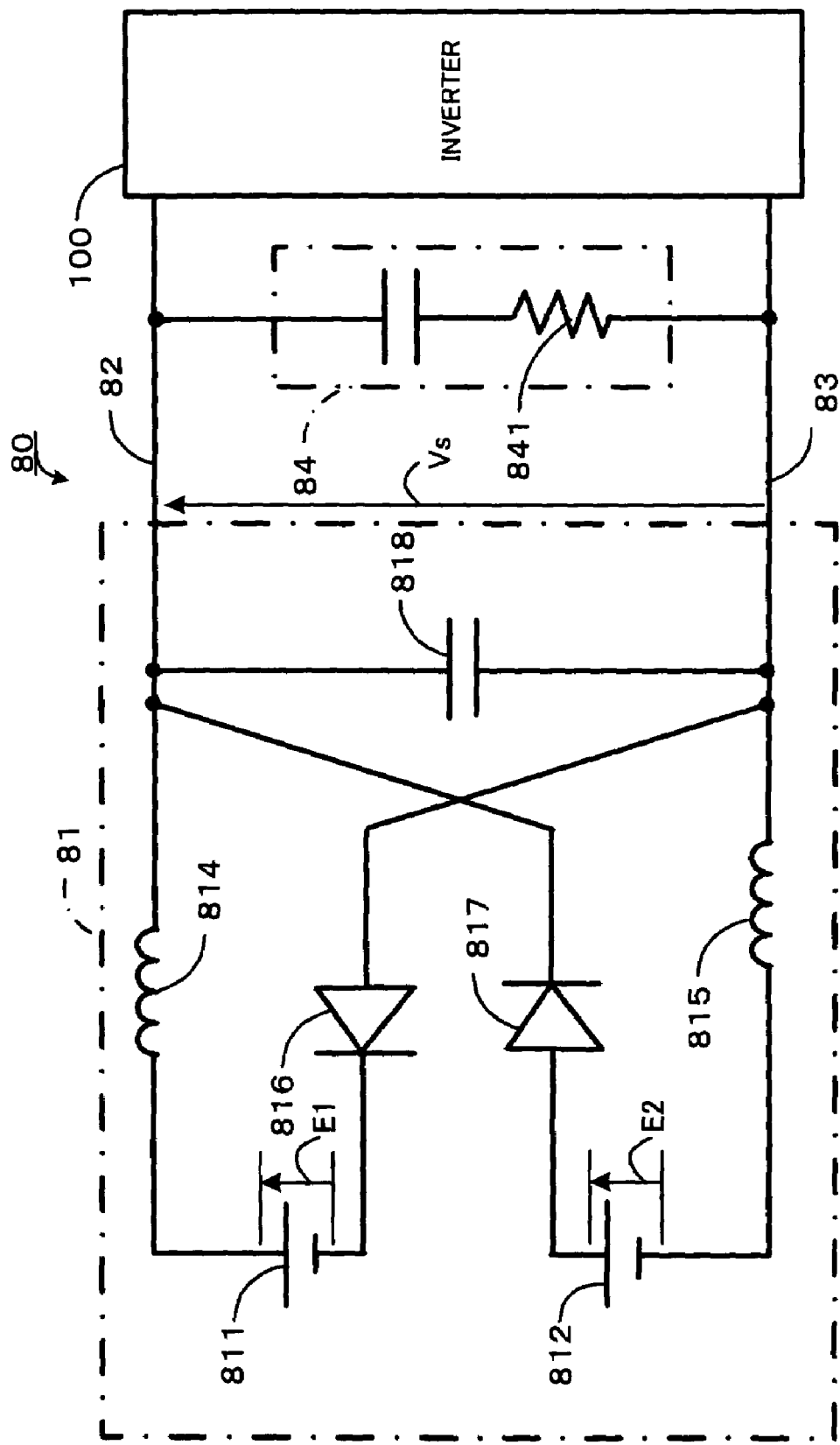
FIG. 14 is a circuit diagram showing a condition in which storage cells are connected in parallel in the cell module of the system in FIG. 12.

In the cell module 81, the transistor 813 is driven by the system controller 85 and repeats an ON/OFF operation in a predetermined high-speed cycle. The duty of the transistor 813 (the proportion of the 'ON' time in a single cycle) is variable and is controlled by the system controller 85. When the transistor 813 is ON, as shown in FIG. 13, current flows through the second storage cell 812, the transistor 813, the first storage cell 811, the first inductor 814, the positive system voltage line 82, the capacitor module 84 (or the inverter 100), the negative system line 83, and the second inductor 815 in this order. At such time, the two storage cells 811 and 812 are serially connected. On the other hand, when the transistor 813 is OFF, as shown in FIG. 14, current flows through a path which is the first storage cell 811, the first inductor 814, the positive system voltage line 82, the capacitor module 84 (or the inverter 100), the negative system line 83, and the first diode 816 in this order, and current also flows through the second storage cell 812, the second diode 817, the positive system voltage line 82, the capacitor module 84 (or the inverter 100), the negative system line 83, and the second inductor 815 in this order. At such time, the two storage cells 811 and 812 are connected in parallel. Thus, a serial connection and a parallel connection of the two storage cells 811 and 812 are switched in the operation of a single cycle. Here, when the voltages of the storage cells 811 and 812 are E (=E1=E2) and the duty of the transistor 813 is a, the substantial output voltage of the cell module 81 (that is, the substantial system voltage) Vs is Vs=(1+α) E, and the system voltage Vs is continuously variable in the range E to 2E.

The capacitor module 84 is a condenser for distributing the load with respect to the cell module 81, and more particularly fulfills the role of supplying a large amount of electric power to the inverter 100 and absorbing a large amount of electric power from the inverter 100, thus having a large capacitance that is adequate to fulfill this role, such as a Farad-order capacitance, for example. In this connection, because the capacitance of the noise removal condenser 818 in the cell module 81 is several microfarads at the most, for example, when these two capacitances are compared, the Farad-order capacitance of the capacitor module 84 is far larger. Also, due to the size of the capacitance of the capacitor module 84, the internal resistance 841 of the capacitor module 84 is also considerably large, and hence the capacitor module 84 is not able to act as a noise removal condenser for the cell module

81. In this respect, despite constituting the same condenser, the capacitor module 84 and the noise removal condenser 818 are completely different in the roles which same fulfill.

The inverter 100 is desirably a DC/AC conversion circuit of a type which has a broad input voltage range that includes the variable range E to 2E of the system voltage Vs described above and that allows the desired voltage and current to be obtained for the motor 110 irrespective of the value of the input voltage within this range. Alternatively, a DC/AC converter having an input voltage range which is in the system voltage continuously variable range E to 2E of the system such that the input voltage range is ¾E to E, for example, could also be used as the inverter 100.

The system controller 85 inputs the system voltage Vs, the output current Io of the power supply system 80, the output current Ib of the cell module 81, the output currents Ib1 and Ib2 of the storage cells 811 and 812, an operation signal that represents the operating states of the load (the inverter 100 and the motor 110) which is inputted by an external circuit that is not shown (for example, a signal that expresses whether the motor 110 is operating or has stopped, whether the motor 110 is subject to a powering operation or a regeneration operation, and expressing the size of the electric power P required by the inverter 100), and so forth, and the system controller 85 thus controls the system voltage Vs by regulating the duty of the transistor 813 on the basis of this input signal. The system voltage Vs is the voltage across the capacitor module 84. Therefore, the capacitor module 84 can discharge energy to the inverter 100 and absorb energy from the inverter 100 in an amount that corresponds with the variable width E to 2E of the system voltage Vs.

A description will now be provided using a simple numerical value example. The assumption is made that the output voltages E of the storage cells 811 and 812 are substantially fixed at 200[V], for example. The system voltage Vs can thus be varied within the range from 200[V] to 400[V]. Therefore, when the static capacitance of the capacitor module 84 is 'C', the maximum energy Qmax that can be stored by the capacitor module 84 and the energy Qc that can be discharged and absorbed by the capacitor module 84 according to the control of the system voltage Vs are:

$$Q\text{max} = \frac{1}{2} \times C \times 400^2$$

$$Qc = \frac{1}{2} \times C \times (400^2 - 200^2)$$

Therefore, in this simple example, the energy Qc that can be used as a result of discharge from or absorption by the capacitor module 84 reaches 75% of the maximum energy Qmax that can be stored by the capacitor module 84.

As can be seen from the above example (which is not actually quite so simple), according to the hybrid power supply system 80 shown in FIG. 12, the benefit is afforded that the usage efficiency of the capacitor module 84 is extremely high.

When this benefit arises, the control of the system voltage Vs can be performed as follows, for example. In other words, when a large amount of electric power must be supplied to the motor 110 during powering of the motor 110, the system voltage Vs is reduced by lowering the duty of the transistor 813. As a result of this drop in the system voltage Vs, the energy Q that remains in the capacitor module 84 is discharged from the capacitor module 84 and supplied to the inverter 100. Also, when a large amount of electric power must be fed back from the motor 110 during regeneration of the motor 110, the system voltage Vs is increased by raising the duty of the transistor 813. As a result of this rise in the system voltage Vs, the energy Q that is deficient in the capacitor module 84 is fed back from the inverter 100 to the capacitor module 84.

Thus, by increasing/decreasing the system voltage Vs in accordance with the size of the electric power required by the inverter 100, the current Ic of the capacitor module 84 is changed markedly, whereby a large amount of electric power can be supplied from the capacitor module 84 to the inverter 100 or conversely fed back from the inverter 100 to the capacitor module 84. Accordingly, the output power of the cell module 81 does not fluctuate greatly, and ideally the average value of the severely fluctuating electric power required by the inverter 100 is outputted. Thus, because the output power of the cell module 81 can be stabilized (the system voltage Vs fluctuates greatly), the output currents Ib1 and Ib2 of the storage cells 811 and 812 respectively do not fluctuate greatly either.

In addition, because the hybrid power supply system 80 shown in FIG. 12 uses a serial/parallel chopper circuit as the cell module 81, the output currents Ib1 and Ib2 of the storage cells 811 and 812 respectively can be suppressed so as to be smaller than those of a conventional power supply system.

In other words, for example, a case is assumed in which the system that uses the conventional-type DC/DC converter shown in FIG. 2 operates under the conditions that the cell voltage is 2E and the fluctuation range of the system voltage is 2E to E, for example. In this case, when the load requires the electric power P, the load current varies within the range P/E to P/2E in accordance with the system voltage. Although the average value of the cell current is P/2E irrespective of the system voltage, a peak current in the range P/E to P/2E which is like the load current flows in accordance with the ON/OFF of internal switching elements through the constituent elements of the cell and the DC/DC converter. Therefore, the constituent elements of the DC/DC converter need to withstand a maximum current P/E. Further, even if the average current in the cell is P/2E, when the maximum current P/E is flowing, this maximum current brings about heat generation in the cell and efficiency degradation.

On the other hand, in the system that uses a serial/parallel chopper circuit according to the present invention shown in FIG. 12, under operating conditions that are the same as those mentioned above, a load current P/2E flows when the cell is serially connected, and a load current P/E flows when the cell is connected in parallel, and the maximum current per cell is P/2E during both a serial and parallel connection. In other words, regardless of the state, only the maximum current P/2E flows in the constituent elements of the cell and serial/parallel chopper circuit. The size of this maximum current is merely half of that of the above-described conventional system. This also means that the serial/parallel chopper circuit of the system in FIG. 12 is highly efficient in comparison with the DC/DC converter of the conventional system and permits miniaturization. The efficiency of the cell and the lifespan thereof are also improved.

Furthermore, according to the hybrid power supply system 80 shown in FIG. 12, because the capacitor module 84 is directly connected to the inverter 100, the problem which involves a response delay caused by the interposition of a DC/DC converter as in the conventional system 9 shown in FIG. 3 does not exist.

Further, although the hybrid power supply system 80 shown in FIG. 12 uses only a single cell module 81, a plurality of the same cell modules 81 can also be used. For example, by connecting a plurality of the same cell modules 81 in parallel to the capacitor module 84, a larger storage capacity can be obtained. Further, by serially connecting a plurality of the same cell modules 81 to the capacitor module 84, the variable range of the system voltage Vs can be increased still further. Parallel and serial connections of this plurality of cell modules 81 can also be combined.

Figure 15:
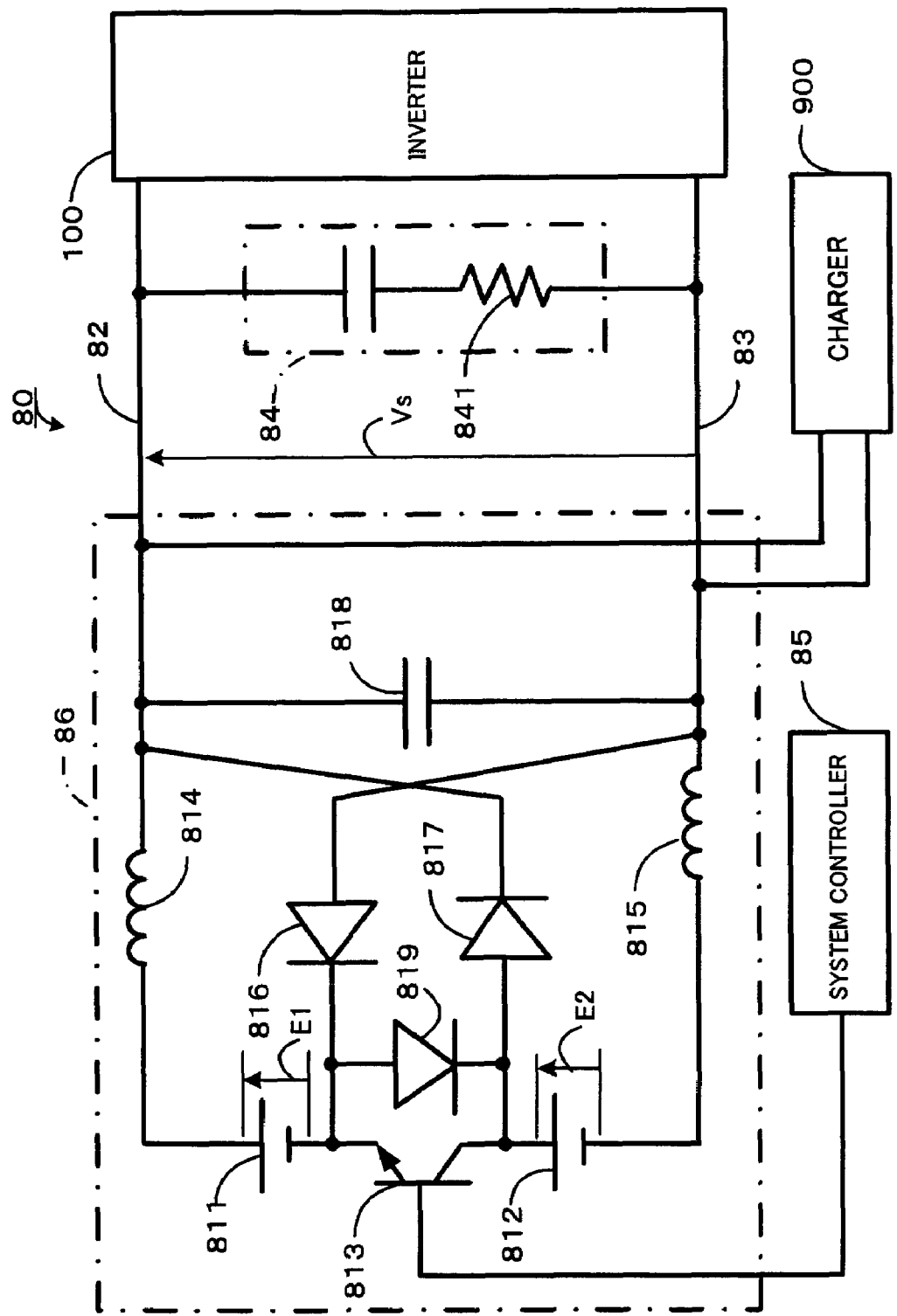
FIG. 15 is a block diagram showing a modified example of the hybrid power supply system according to another embodiment of the present invention.

FIG. 15 shows a modified example of the cell module.

In the cell module 86 shown in FIG. 15, in addition to the constitution of the serial/parallel chopper circuit of the cell module 81 shown in FIG. 12, a third diode 819 is connected between the negative terminal of the first storage cell 811 and the positive terminal of the second storage cell 812 so as to establish a flow in a forward direction from the former toward the latter.

When a voltage (substantially 2E) produced by adding together the voltage E1 (=E) of the first storage cell 811, the forward voltage drop across the diode 819, and the voltage E2 (=E) of the second storage cell 812 is chosen so as to match the desired maximum voltage (maximum input voltage of the inverter 100, for example), the system voltage Vs is clamped by the hardware at this desired maximum voltage. For this reason, in a condition in which the capacitor module 84 is recharged to a maximum by regeneration energy from the inverter 100 and the system voltage Vs has reached the maximum voltage, the storage cells 811 and 812 are recharged as a result of regeneration energy from the inverter 100 being fed back to the storage cells 811 and 812 via the diode 819. Thus, recharging of the storage cells 811 and 812 is possible by feeding back regeneration energy from the load to the storage cells 811 and 812.

Further, in cases where the storage cells 811 and 812 are recharged by using an external charger (DC low voltage power supply device) 900, the charger is connected to the output terminals (system voltage lines 82 and 83) of the cell module 86 itself without withdrawing wiring from the individual storage cells 811 and 812 in the cell module 86. Hence, particularly in a condition in which the cell module 86 is still mounted in a vehicle or the like, when the storage cells 811 and 812 are going to be recharged, the charger 900 can be connected in a straightforward manner.

Figure 16:
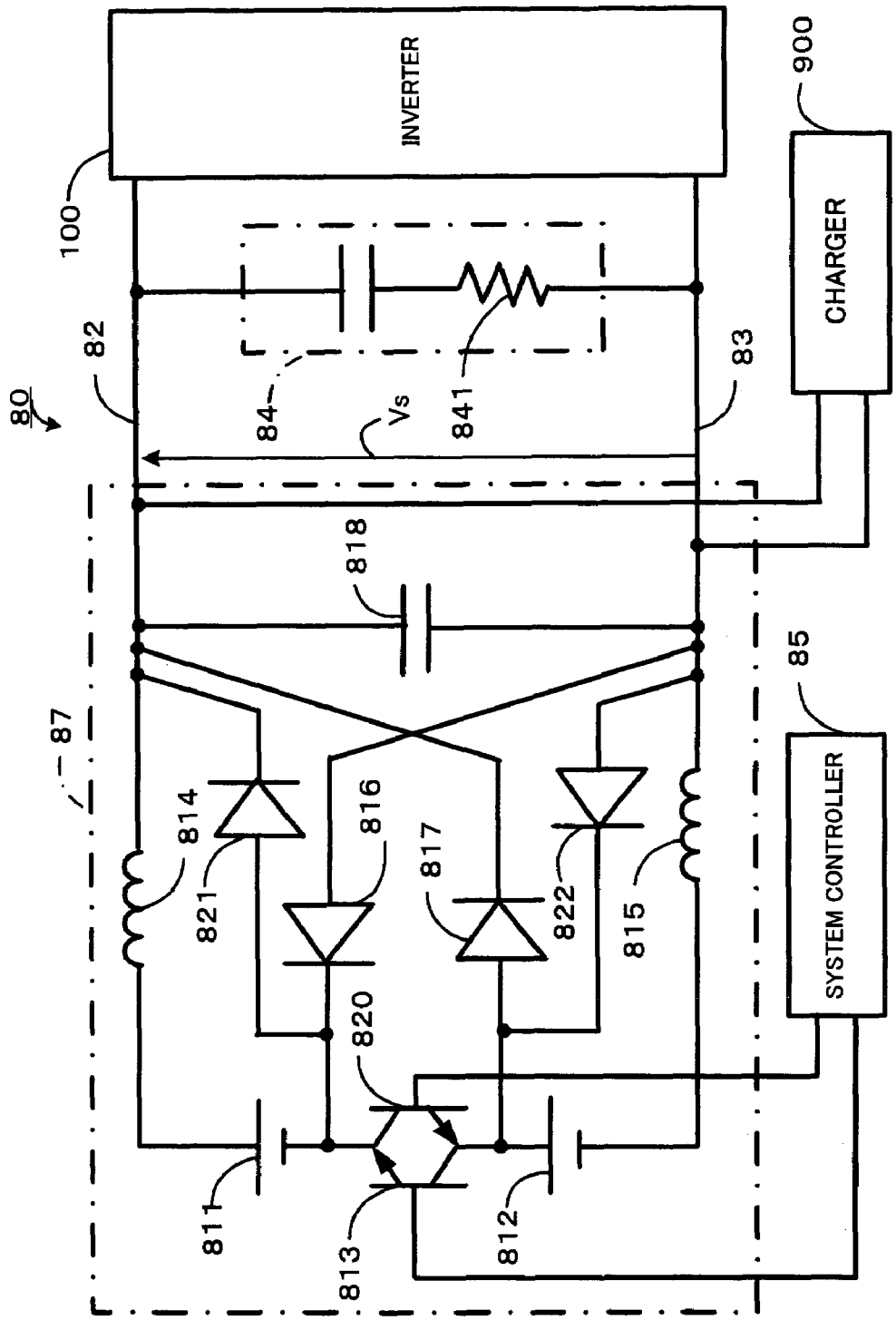
FIG. 16 is a block diagram showing another modified example of the hybrid power supply system according to another embodiment of the present invention.

FIG. 16 shows another modified example of the cell module.

The cell module 87 shown in FIG. 16 is constituted as follows. In the cell module 86 shown in FIG. 15, the third diode 819 is substituted by a second transistor 820, and, connected between the negative terminal of the first storage cell 811 and the positive output terminal (that is, the positive system voltage line 82) of the cell module 87 is a fourth diode 821 so as to establish a flow in a forward direction from the former toward the latter, and connected between the positive terminal of the second storage cell 812 and the negative output terminal (that is, the negative system voltage line 83) of the cell module 87 is a fifth diode 822 so as to establish a flow in a forward direction from the latter toward the former. The base of the second transistor 820 is connected to a recharge control output terminal of the system controller 85, and performs an ON/OFF operation in accordance with a recharge control signal from the system controller 85.

In the cell module 87 shown in FIG. 16, if the second transistor 820 is turned ON, in the same way as the cell module 86 shown in FIG. 15, the storage cells 811 and 812 can be recharged by the regeneration energy from the inverter 100 in a condition where the system voltage Vs matches a predetermined maximum value, and the storage cells 811 and 812 can be recharged by the external charger (DC low voltage power supply device) 900 which is connected to the output terminals (the system voltage lines 82 and 83) of the cell module 87. During the recharging, by turning the second transistor 820 ON/OFF at high speed and regulating the duty thereof, the recharge current for the storage cells 811 and 812 can be controlled to the desired value.

Figure 17:
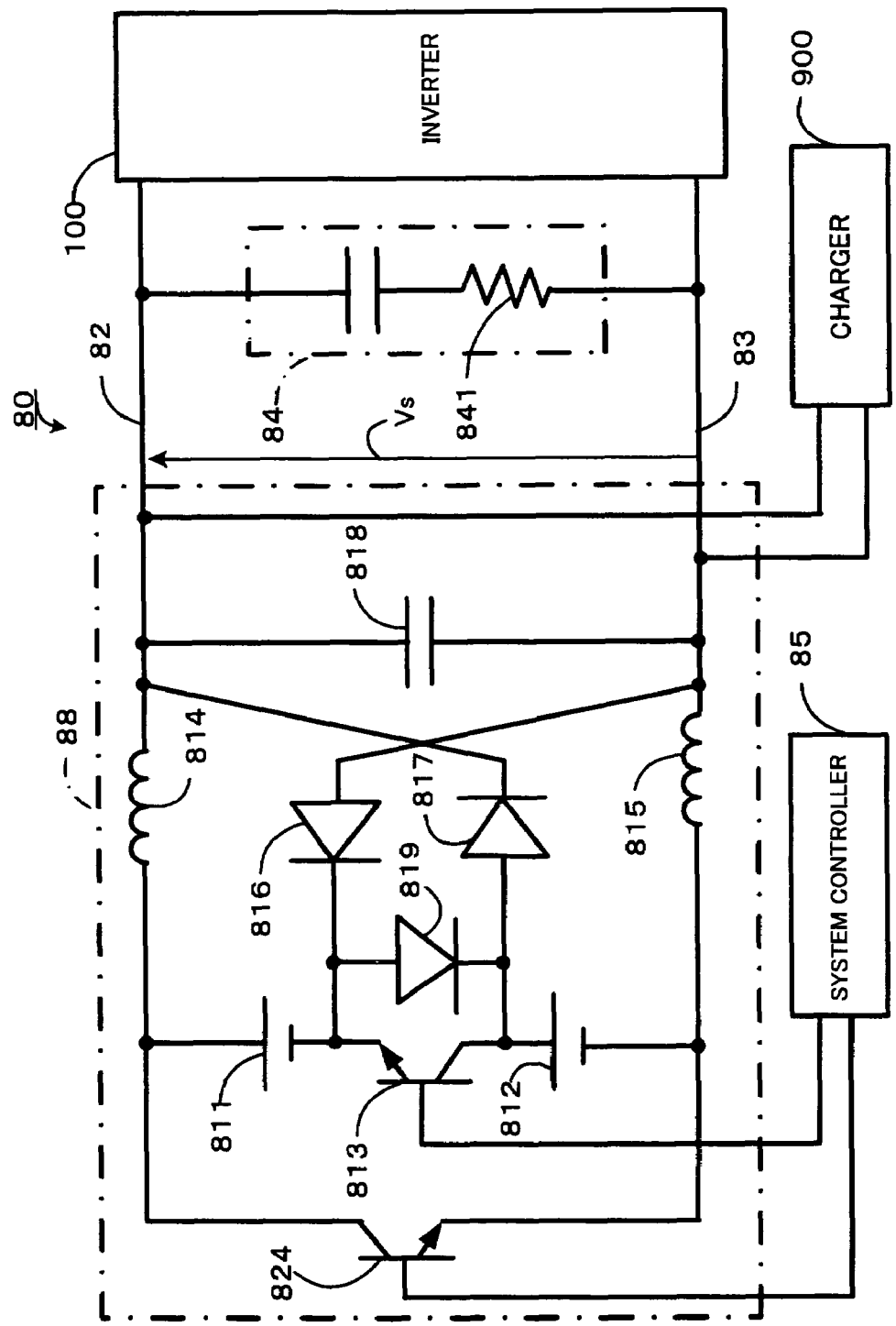
FIG. 17 is a block diagram showing yet another modified example of the hybrid power supply system according to another embodiment of the present invention.

FIG. 17 shows yet another modified example of the cell module.

In the cell module 88 shown in FIG. 17, a second transistor 824 has been added to the constitution shown in FIG. 15, and the collector-emitter path of the second transistor 824 is serially connected between the positive terminal of the first storage cell 811 and the negative terminal of the second storage cell 812, such that when the second transistor 824 turns ON, a current path is formed in which current flows from the positive output terminal 82 of the cell module 88 to the negative output terminal (system voltage line) 83 via the first inductor 814, the second transistor 824 and the second inductor 815 in this order. The base of the second transistor 824 is connected to the recharge control output terminal of the system controller 85 such that the second transistor 824 turns ON/OFF in accordance with the recharge control signal from the system controller 85.

In the same way as the above-described cell module 87 shown in FIG. 16, in the cell module 88 shown in FIG. 17, regeneration energy can be fed back to the storage cells 811 and 812, and the storage cells 811 and 812 can thus be recharged by using the charger 900 which is connected to the output terminals 82 and 83 of the cell module 87. In cases where the storage cells 811 and 812 are recharged by the charger, whereas the above-described cell module 87 shown in FIG. 16 requires the charger 900 that has an output voltage which is higher than the serial voltage 2E of the storage cells 811 and 812, where the cell module 88 shown in FIG. 17 is concerned, turning the second transistor 824 ON/OFF at high speed causes energy to be stored in the inductors 814 and 815 when the transistor is ON and causes energy to be discharged when same is OFF. This discharged energy is fed back to the storage cells 811 and 812 under the action of a high counter electromotive force, and therefore a charger 900 having an output voltage of 2E or less can also be employed. The recharge current can be controlled through regulation of the duty of the second transistor 824.

Figure 18:
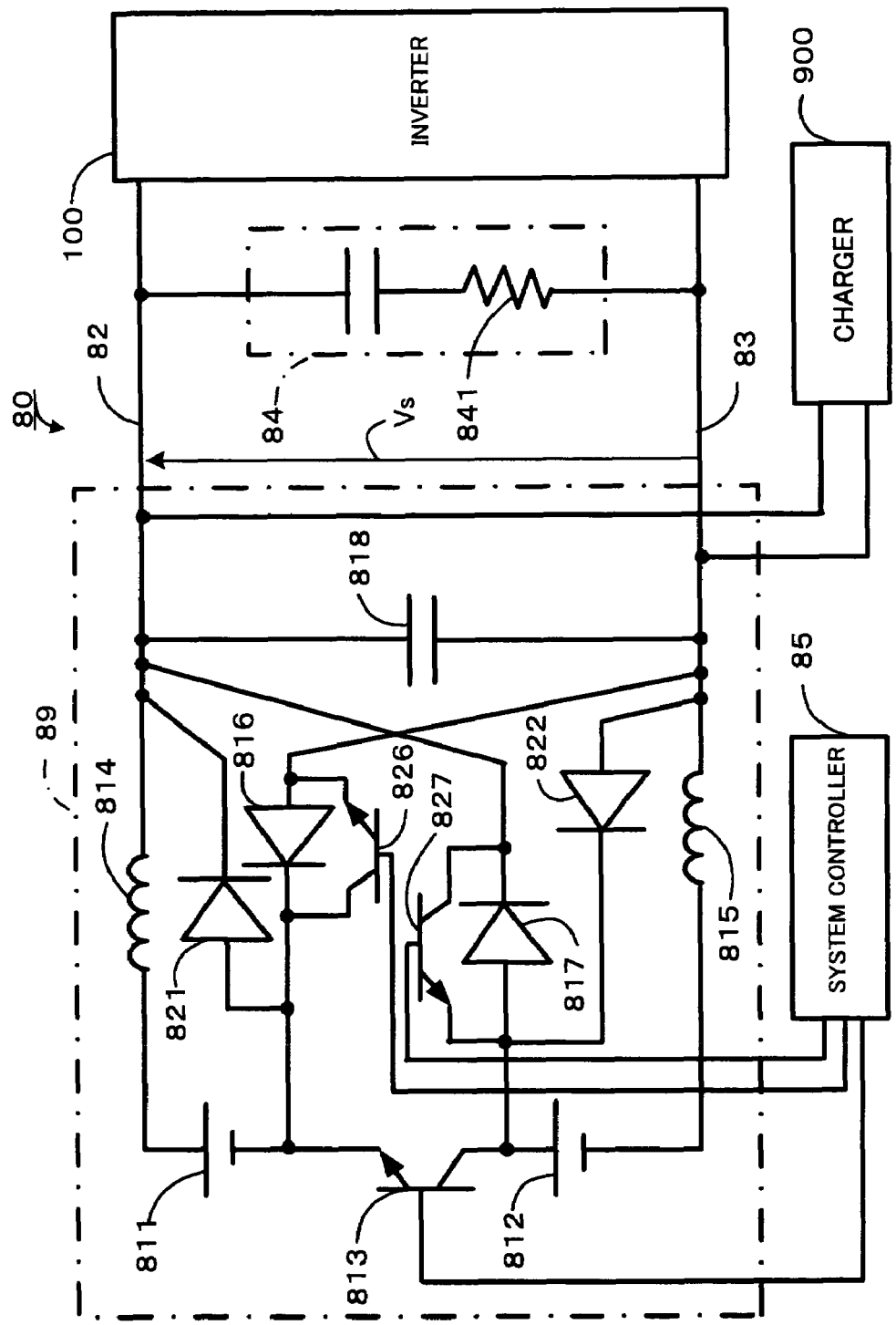
FIG. 18 is a block diagram showing yet another modified example of the hybrid power supply system according to another embodiment of the present invention.

FIG. 18 shows yet another modified example of the cell module.

The cell module 89 shown in FIG. 18 is constituted as follows. In the constitution shown in FIG. 16, the second transistor 820 is removed and third and fourth transistors 826 and 827 respectively are added. The emitter-collector path of the third transistor 826 is connected across the terminals of the first diode 816 such that when the third transistor 826 turns ON, a short circuit across the terminals of the first diode 816 is produced. Also, the emitter-collector path of the fourth transistor 827 is connected across the terminals of the second diode 817 such that when the fourth transistor 827 turns ON, a short circuit across the terminals of the second diode 817 is produced. The respective bases of the third and fourth transistors 826 and 827 are connected to two recharge control output terminals of the system controller 85 such that the third and fourth transistors 826 and 827 are turned ON/OFF in accordance with two respective recharge control signals from the system controller 85.

With the cell module 89 shown in FIG. 18 also, the storage cells 811 and 812 can be recharged by regeneration energy from the load circuit or by the charger 900 which is connected to the output terminals 82 and 83 of the cell module 89. The output voltage of the charger 900 can be 2E or less. During recharging, the third transistor 826 governs the recharging of the first storage cell 811 and the recharge current of the first storage cell 811 can be controlled through regulation of the duty of this transistor. The fourth transistor 827 governs the recharging of the second storage cell 812 and the recharge current of the second storage cell 812 can be controlled through regulation of the duty of this transistor.

Figure 19:
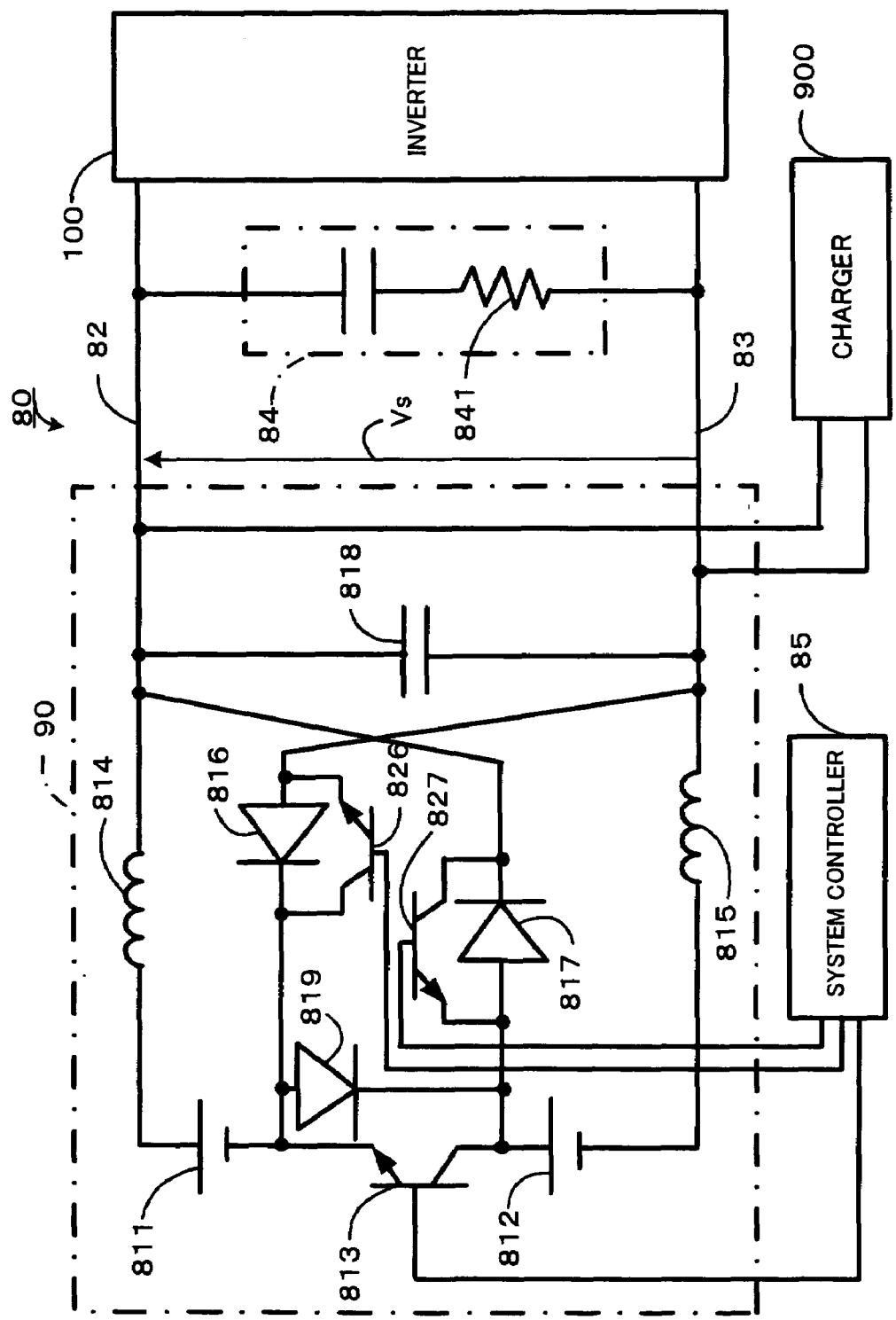
FIG. 19 is a block diagram showing yet another modified example of the hybrid power supply system according to another embodiment of the present invention.

FIG. 19 shows yet another modified example of the cell module.

The cell module 90 shown in FIG. 19 is constituted by adding third and fourth transistors 826 and 827 respectively to the constitution shown in FIG. 15 which are like those for the cell module 89 of FIG. 18. With the cell module 90 in FIG. 19 also, the storage cells 811 and 812 can be recharged by regeneration energy from the load circuit or by the charger 900 which is connected to the output terminals 82 and 83. The output voltage of the charger 900 can be 2E or less. The recharge currents of the first and second storage cells 811 and 812 respectively can be controlled separately through regulation of the respective duty for the high-speed ON/OFF operation of the third and fourth transistors 826 and 827.

Figure 20:
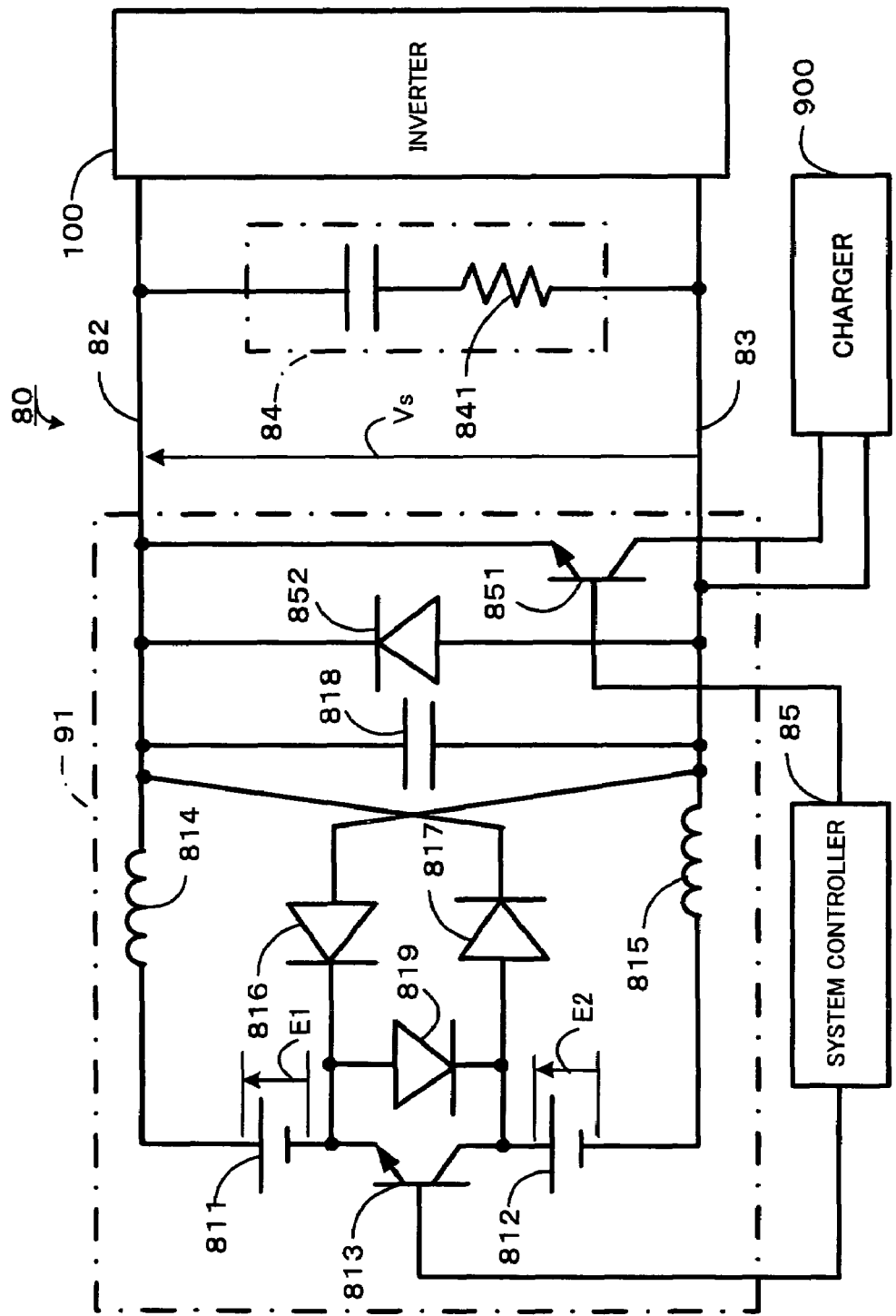
FIG. 20 is a block diagram showing yet another modified example of the hybrid power supply system according to another embodiment of the present invention.

FIG. 20 shows yet another modified example of the cell module.

The cell module 91 shown in FIG. 20 is constituted as follows. In the constitution shown in FIG. 15, a transistor 851, which serves to control, by means of a PWM method, the recharge current from the charger 900 which is connected to the output terminals 82 and 83, is connected between the output terminal 82 and the charger 900, and a reflux current diode 852, which serves to allow the recharge current to flow when the transistor 851 is OFF, is connected between the output terminals 82 and 83. With the cell module 91 shown in FIG. 20 also, the storage cells 811 and 812 can be recharged by regeneration energy from the load circuit or by the charger 900 which is connected to the output terminals 82 and 83. The output voltage of the charger 900 is 2E or more. The recharge currents of the storage cells 811 and 812 can be controlled through regulation of the respective duty for the high-speed ON/OFF operation of the transistor 851.

With regard to any of the above-described cell modules 87, 88, 89, 90 and 91 shown in FIGS. 16 to 20 respectively, because the cell module itself possesses a function to control the recharge current, the charger 900 need not possess a current control function. For this reason, a simple structure in which a three-phase or single-phase mains supply AC voltage or similar is regulated by a low cost diode bridge can be employed for the charger 900. Particularly with the cell modules of FIGS. 17 to 19, because the output voltage of the charger 900 can also be less than 2E, even if a low voltage mains supply such as a 200V AC supply is used, practical recharging of the cell module with a maximum output voltage of several hundred volts is feasible.

Embodiments of the present invention have been described hereinabove, but these embodiments serve to illustrate the description of the present invention and there is no intention to limit the scope of the present invention to these embodiments alone. The present invention can accordingly be implemented by means of a variety of other embodiments without departing from the spirit of this invention.

For example, in the first embodiment described above, in the hybrid power supply system 20 shown in FIG. 4, a capacitor 21 is connected in series between the system voltage lines 26 and 27, the storage cell 22 and the voltage controller 23 are directly connected in series, and the serially connected body constituted thereby is directly connected between the system lines 26 and 27. However, this does not mean that such a circuit configuration is imperative. The capacitor 21 could also be connected indirectly between the system voltage lines 26 and 27 via any given additional circuit elements, the storage cell 22 and the voltage controller 23 could be indirectly connected in series to one another, or the serially connected body formed by the storage cell 22 and the voltage controller 23 could be connected indirectly between the system voltage lines 26 and 27.

Moreover, in the above-described embodiments, although a storage cell is used as an energy type power supply device, and a capacitor (capacitor module) is used as a power type power supply device, a fuel cell or an engine drive generator could instead be employed as the energy type power supply device or a hybrid cell and the like could instead be employed as the power type power supply device.

The invention claimed is:

1. A hybrid power supply system, comprising:
   system voltage lines which are connected to a load;
   an energy type power supply device connected to the system voltage lines;
   a power type power supply device connected to the system voltage lines;
   system voltage control means having a voltage controller that change the voltage of the power type power supply device by changing the voltage of the system voltage lines, and thus allow electric power to be outputted from the power type power supply device to the system voltage lines and electric power to be absorbed by the power type power supply device from the system voltage lines;
   an additional energy type power supply device which is provided separately from the energy type power supply device in order to supply electric power to an input terminal of the voltage controller; and
   a power supply defect detector that detects a defect in the electric power supply capacity of the energy type power supply device,
   wherein, when the defect is detected by the power supply defect detector, the system voltage control means disconnects the defective energy type power supply device from use so that the output voltage of the voltage controller then operates under the electric power from the additional power supply device that is applied to the system voltage lines directly.

2. The hybrid power supply system according to claim 1, wherein the system voltage control means change the system voltage in accordance with the electric power required by the load.

3. The hybrid power supply system according to claim 1, wherein the system voltage control means reduce the system voltage when electric power is to be supplied to the load, and raise the system voltage when electric power is to be fed back from the load.

4. The hybrid power supply system according to claim 1, wherein the voltage controller having a variable output voltage; the output terminal of the voltage controller is serially connected to the energy type power supply device; and a body formed by the serial connection between the energy type power supply device and the output terminal of the voltage controller is connected to the system voltage lines in parallel with the power type power supply device.

5. The hybrid power supply system according to claim 4, wherein the system voltage control means further comprises: a plurality of power supply modules connected in parallel with the system voltage lines, and each power supply module is constituted by a body formed by a serial connection between the energy type power supply device and the output terminal of the voltage controller.

6. The hybrid power supply system according to claim 1, wherein the system voltage control means further comprises: a plurality of energy type power supply devices which are connected to the system voltage lines, and switches that selectively connect the plurality of energy type power supply devices to the system voltage lines in series or in parallel; and wherein the system voltage control means change the system voltage depending on whether the plurality of energy type power supply devices are connected in series or in parallel.

7. A hybrid power supply system, comprising:
system voltage lines which are connected to a load;
an energy type power supply device connected to the system voltage lines;
a power type power supply device connected to the system voltage lines; and
system voltage control means having a voltage controller that change the voltage of the power type power supply device by changing the voltage of the system voltage lines, and thus allow electric power to be outputted from the power type power supply device to the system voltage lines and electric power to be absorbed by the power type power supply device from the system voltage lines,
wherein the system voltage control means reduce the system voltage when electric power is applied to the load, and raise the system voltage when electric power is fed back from the load.

8. A hybrid power supply system, comprising:
output terminals;
a serial/parallel chopper circuit that comprises a plurality of energy type power supply devices and switching elements, which serial/parallel chopper circuit causes the plurality of energy type power supply devices to be alternately connected in series and in parallel between the output terminals as a result of the ON/OFF operation of the switching elements, and outputs the output voltage to the output terminals, this output voltage being at a level that corresponds to the duty of the switching elements;
a power type power supply device connected between the output terminals; and
a controller that performs an ON/OFF operation by driving the switching elements of the serial/parallel chopper circuit and increases/decreases the level of the output voltage by controlling the duty of the switching elements.

9. The hybrid power supply system according to claim 8, wherein the serial/parallel chopper circuit further comprises a current path for feeding back electrical energy from the output terminals to the energy type power supply devices.

10. The hybrid power supply system according to claim 9, wherein the serial/parallel chopper circuit further comprises:
an inductor that serves to temporarily store the electrical energy fed back from the output terminals and to discharge the stored electrical energy to the energy type power supply device; and
current control means for controlling the current flowing in the inductor so that electrical energy is stored and then discharged by the inductor.

11. The hybrid power supply system according to claim 8, wherein the serial/parallel chopper circuit further comprises current paths for feeding back electrical energy from the output terminals to the energy type power supply devices individually.

12. The hybrid power supply system according to any one of claims 9 to 11, wherein the serial/parallel chopper circuit further comprises current control means that serve to control the size of the recharge current for the energy type power supply devices when electrical energy is fed back from the output terminals to the energy type power supply devices.

* * * * *